United States Patent
Miller

(10) Patent No.: US 8,108,977 B1
(45) Date of Patent: Feb. 7, 2012

(54) MACHINE, METHODS, AND PROGRAM PRODUCT FOR ELECTRONIC ORDER ENTRY

(75) Inventor: Eric D. Miller, San Mateo, CA (US)

(73) Assignee: Metabank, Sioux Falls, SD (US)

( * ) Notice: Subject to any disclaimer, the term of this patent is extended or adjusted under 35 U.S.C. 154(b) by 0 days.

(21) Appl. No.: 12/609,896

(22) Filed: Oct. 30, 2009

Related U.S. Application Data

(60) Provisional application No. 61/110,319, filed on Oct. 31, 2008.

(51) Int. Cl.
*G06Q 30/00* (2006.01)

(52) U.S. Cl. .................................. 26/82; 705/27.1
(58) Field of Classification Search .............. 705/26, 705/27

See application file for complete search history.

(56) References Cited

U.S. PATENT DOCUMENTS

| | | |
|---|---|---|
| 3,752,904 A | 8/1973 | Waterbury |
| 4,247,759 A | 1/1981 | Yuris et al. |
| 4,334,307 A | 6/1982 | Bourgeois et al. |
| 4,439,636 A | 3/1984 | Newkirk et al. |
| 4,449,040 A | 5/1984 | Matsuoka et al. |
| 4,528,643 A | 7/1985 | Freeny, Jr. |
| 4,532,416 A | 7/1985 | Berstein |
| 4,577,061 A | 3/1986 | Katzeff et al. |
| 4,625,276 A | 11/1986 | Benton et al. |
| 4,677,565 A | 6/1987 | Ogaki et al. |
| 4,678,895 A | 7/1987 | Tateisi et al. |
| 4,706,275 A | 11/1987 | Kamal |
| 4,722,054 A | 1/1988 | Yorozu et al. |
| 4,727,243 A | 2/1988 | Savar |
| 4,750,201 A | 6/1988 | Hodgson et al. |
| 4,797,540 A | 1/1989 | Kimizu |
| 4,827,113 A | 5/1989 | Rikuna |
| 4,868,900 A | 9/1989 | McGuire |

(Continued)

FOREIGN PATENT DOCUMENTS

EP 0348932 1/1990

(Continued)

OTHER PUBLICATIONS

Zubko, N. "An automatic connection: electronic transaction tools help manufacturers connect with suppliers to streamline sourcing efforts", Jul. 2008, Industry Week, vol. 257 , No. 7 , pp. 26-27.*

(Continued)

*Primary Examiner* — Jeffrey A Smith
*Assistant Examiner* — Resha Desai
(74) *Attorney, Agent, or Firm* — Bracewell & Giuliani LLP

(57) ABSTRACT

Systems, methods, and program product for facilitating electronic ordering of goods, services, or goods and services, or other products, through messaging over a financial services electronic payment network, are provided. A customer provides electronic order registration activation information for an electronic order transaction card. The customer is provided an electronic order card having a unique electronic payment network compatible electronic order card identifier including a non-financial transaction IIN and a customer number, and is provided a catalogue or list including product order codes each associated with a different product, to enable electronic ordering over the financial services electronic payment network. An electronic order card configured to interface with a conventional point-of-sale terminal can be used to facilitate the electronic ordering over the existing financial services electronic payment network when presented to the point-of-sale terminal with a product order code identifying a selected product.

20 Claims, 14 Drawing Sheets

U.S. PATENT DOCUMENTS

| | | | |
|---|---|---|---|
| 4,877,947 A | 10/1989 | Mori | |
| 4,879,744 A | 11/1989 | Tasaki et al. | |
| 4,884,212 A | 11/1989 | Stutsman | |
| 4,951,308 A | 8/1990 | Bishop et al. | |
| 4,968,873 A | 11/1990 | Dethloff et al. | |
| 5,012,077 A | 4/1991 | Takano | |
| 5,048,085 A | 9/1991 | Abraham et al. | |
| 5,050,207 A | 9/1991 | Hitchcock | |
| 5,068,891 A | 11/1991 | Marshall | |
| 5,101,098 A | 3/1992 | Naito | |
| 5,138,650 A | 8/1992 | Stahl et al. | |
| 5,146,067 A | 9/1992 | Sloan et al. | |
| 5,148,481 A | 9/1992 | Abraham et al. | |
| 5,155,342 A | 10/1992 | Urano | |
| 5,163,086 A | 11/1992 | Ahearn et al. | |
| 5,192,947 A | 3/1993 | Neustein | |
| 5,220,593 A | 6/1993 | Zicker et al. | |
| 5,221,838 A | 6/1993 | Gutman et al. | |
| 5,225,666 A | 7/1993 | Amarena et al. | |
| 5,264,689 A | 11/1993 | Maes et al. | |
| 5,265,155 A | 11/1993 | Castro | |
| 5,266,782 A | 11/1993 | Alanärä et al. | |
| 5,272,320 A | 12/1993 | Hakamada | |
| 5,278,752 A | 1/1994 | Narita et al. | |
| 5,285,382 A | 2/1994 | Muehlberger et al. | |
| 5,327,482 A | 7/1994 | Yamamoto | |
| 5,334,821 A | 8/1994 | Campo et al. | |
| 5,340,969 A | 8/1994 | Cox | |
| 5,352,876 A | 10/1994 | Watanabe et al. | |
| 5,359,182 A | 10/1994 | Schilling | |
| 5,409,092 A | 4/1995 | Itako et al. | |
| 5,416,306 A | 5/1995 | Imahata | |
| 5,438,186 A | 8/1995 | Nair et al. | |
| 5,442,567 A | 8/1995 | Small | |
| 5,448,044 A | 9/1995 | Price et al. | |
| 5,477,038 A | 12/1995 | Levine et al. | |
| 5,504,808 A | 4/1996 | Hamrick, Jr. | |
| 5,511,114 A | 4/1996 | Stimson et al. | |
| 5,513,117 A | 4/1996 | Small | |
| 5,550,358 A | 8/1996 | Tait et al. | |
| 5,577,109 A | 11/1996 | Stimson et al. | |
| 5,577,121 A | 11/1996 | Davis et al. | |
| 5,661,254 A | 8/1997 | Steuer et al. | |
| 5,696,908 A | 12/1997 | Muehlberger et al. | |
| 5,699,528 A | 12/1997 | Hogan | |
| 5,732,136 A | 3/1998 | Murphree et al. | |
| 5,814,798 A | 9/1998 | Zancho | |
| 5,841,365 A | 11/1998 | Rimkus | |
| 5,859,419 A | 1/1999 | Wynn | |
| 5,875,437 A | 2/1999 | Atkins | |
| 5,878,141 A | 3/1999 | Daly et al. | |
| 5,893,907 A | 4/1999 | Ukuda | |
| 5,897,620 A | 4/1999 | Walker et al. | |
| 5,920,848 A | 7/1999 | Schutzer et al. | |
| 5,933,812 A | 8/1999 | Meyer et al. | |
| 5,963,921 A | 10/1999 | Longfield | |
| 6,000,608 A | 12/1999 | Dorf | |
| 6,012,635 A | 1/2000 | Shimada et al. | |
| 6,021,397 A | 2/2000 | Jones et al. | |
| 6,032,859 A | 3/2000 | Muehlberger et al. | |
| 6,041,308 A | 3/2000 | Walker et al. | |
| 6,065,679 A | 5/2000 | Levie et al. | |
| 6,112,191 A | 8/2000 | Burke | |
| 6,144,948 A | 11/2000 | Walker et al. | |
| 6,154,738 A | 11/2000 | Call | |
| 6,189,787 B1 | 2/2001 | Dorf | |
| 6,208,978 B1 | 3/2001 | Walker et al. | |
| 6,249,773 B1 | 6/2001 | Allard et al. | |
| 6,253,998 B1 | 7/2001 | Ziamo | |
| 6,467,684 B2 | 10/2002 | Fite et al. | |
| 6,704,714 B1 | 3/2004 | O'Leary et al. | |
| 6,739,506 B1 | 5/2004 | Constantine | |
| 6,865,544 B1 | 3/2005 | Austin | |
| 6,999,943 B1 | 2/2006 | Johnson et al. | |
| 7,010,507 B1 | 3/2006 | Anderson et al. | |
| 7,031,939 B1 | 4/2006 | Gallagher et al. | |
| 7,072,862 B1 | 7/2006 | Wilson | |
| 7,127,452 B1 | 10/2006 | Yashiro | |
| 7,177,829 B1 | 2/2007 | Wilson | |
| 7,206,761 B2 | 4/2007 | Colvin | |
| 7,258,273 B2 | 8/2007 | Griffin | |
| 7,398,919 B2 | 7/2008 | Cooper | |
| 7,426,492 B1 | 9/2008 | Bishop et al. | |
| 7,451,920 B1 | 11/2008 | Rose | |
| 7,509,286 B1 | 3/2009 | Bent et al. | |
| 7,567,936 B1 * | 7/2009 | Peckover et al. | 705/38 |
| 7,607,570 B1 | 10/2009 | Constantine | |
| 7,628,319 B2 | 12/2009 | Brown et al. | |
| 7,653,591 B1 | 1/2010 | Dabney | |
| 7,702,583 B1 | 4/2010 | Hamilton et al. | |
| 7,757,944 B2 | 7/2010 | Cline et al. | |
| 7,783,571 B2 | 8/2010 | Fish et al. | |
| 7,792,717 B1 | 9/2010 | Hankins et al. | |
| 7,810,735 B2 | 10/2010 | Madani | |
| 7,813,955 B2 | 10/2010 | Ariff et al. | |
| 7,814,012 B2 | 10/2010 | Johnson | |
| 7,904,333 B1 | 3/2011 | Perkowski | |
| 7,933,833 B2 | 4/2011 | Hotz et al. | |
| 8,046,256 B2 | 10/2011 | Chien et al. | |
| 2001/0021925 A1 * | 9/2001 | Ukigawa et al. | 705/39 |
| 2001/0034676 A1 | 10/2001 | Vasic | |
| 2001/0042785 A1 | 11/2001 | Walker et al. | |
| 2002/0002075 A1 | 1/2002 | Rowe | |
| 2002/0032612 A1 * | 3/2002 | Williams et al. | 705/26 |
| 2002/0077971 A1 | 6/2002 | Allred | |
| 2002/0152161 A1 | 10/2002 | Aoike | |
| 2002/0194122 A1 | 12/2002 | Knox et al. | |
| 2002/0194124 A1 | 12/2002 | Hobbs et al. | |
| 2003/0061170 A1 | 3/2003 | Uzo | |
| 2003/0074311 A1 | 4/2003 | Saylors et al. | |
| 2003/0097331 A1 | 5/2003 | Cohen | |
| 2003/0135459 A1 | 7/2003 | Abelman et al. | |
| 2003/0144935 A1 | 7/2003 | Sobek | |
| 2003/0158811 A1 | 8/2003 | Sanders et al. | |
| 2003/0167225 A1 | 9/2003 | Adams | |
| 2003/0191702 A1 | 10/2003 | Hurley | |
| 2003/0191714 A1 | 10/2003 | Norris | |
| 2003/0197059 A1 | 10/2003 | Tidball et al. | |
| 2003/0200118 A1 | 10/2003 | Lee et al. | |
| 2003/0208443 A1 | 11/2003 | Mersky | |
| 2003/0217003 A1 | 11/2003 | Weinflash et al. | |
| 2004/0036215 A1 | 2/2004 | Butler, II | |
| 2004/0098351 A1 | 5/2004 | Duke | |
| 2004/0111370 A1 | 6/2004 | Saylors et al. | |
| 2004/0117250 A1 | 6/2004 | Lubow et al. | |
| 2004/0117302 A1 | 6/2004 | Weichert et al. | |
| 2004/0133515 A1 | 7/2004 | McCoy et al. | |
| 2004/0143527 A1 | 7/2004 | Benkert et al. | |
| 2004/0148252 A1 | 7/2004 | Fleishman | |
| 2004/0153407 A1 | 8/2004 | Clubb et al. | |
| 2004/0215554 A1 | 10/2004 | Kemper et al. | |
| 2004/0225545 A1 | 11/2004 | Turner et al. | |
| 2004/0230523 A1 | 11/2004 | Johnson | |
| 2004/0236646 A1 | 11/2004 | Wu et al. | |
| 2005/0004839 A1 | 1/2005 | Bakker et al. | |
| 2005/0015332 A1 | 1/2005 | Chen | |
| 2005/0021363 A1 | 1/2005 | Stimson et al. | |
| 2005/0075939 A1 | 4/2005 | Bao et al. | |
| 2005/0108121 A1 | 5/2005 | Gravett et al. | |
| 2005/0167481 A1 | 8/2005 | Hansen et al. | |
| 2005/0173520 A1 | 8/2005 | Jaros et al. | |
| 2005/0203837 A1 | 9/2005 | Leigh et al. | |
| 2005/0205663 A1 | 9/2005 | Allgiene | |
| 2005/0228724 A1 | 10/2005 | Frangiosa | |
| 2005/0283436 A1 | 12/2005 | Greer et al. | |
| 2006/0059085 A1 | 3/2006 | Tucker | |
| 2006/0085334 A1 | 4/2006 | Murphy | |
| 2006/0149665 A1 | 7/2006 | Weksler | |
| 2006/0149670 A1 | 7/2006 | Nguyen et al. | |
| 2006/0161499 A1 | 7/2006 | Rich et al. | |
| 2006/0190322 A1 | 8/2006 | Oehlerking et al. | |
| 2006/0206402 A1 | 9/2006 | Sullivan | |
| 2006/0212392 A1 | 9/2006 | Brown | |
| 2006/0212393 A1 | 9/2006 | Brown | |
| 2006/0224502 A1 | 10/2006 | McGowan | |
| 2006/0249570 A1 | 11/2006 | Seifert et al. | |
| 2006/0259957 A1 | 11/2006 | Tam et al. | |

| | | | |
|---|---|---|---|
| 2006/0282356 A1 | 12/2006 | Andres et al. | |
| 2006/0282374 A1 | 12/2006 | Stone | |
| 2007/0000997 A1 | 1/2007 | Lambert et al. | |
| 2007/0011089 A1 | 1/2007 | DeSchryver | |
| 2007/0038515 A1 | 2/2007 | Postrel | |
| 2007/0045401 A1 | 3/2007 | Sturm | |
| 2007/0061206 A1 | 3/2007 | LeFebvre | |
| 2007/0083462 A1 | 4/2007 | Cubillo et al. | |
| 2007/0087819 A1 | 4/2007 | Van Luchene et al. | |
| 2007/0100745 A1 | 5/2007 | Keiser | |
| 2007/0106603 A1 | 5/2007 | Whyte et al. | |
| 2007/0136194 A1 | 6/2007 | Sloan | |
| 2007/0152038 A1 | 7/2007 | Ciancio et al. | |
| 2007/0168265 A1 | 7/2007 | Rosenberger | |
| 2007/0174189 A1 | 7/2007 | Bishop et al. | |
| 2007/0175984 A1 | 8/2007 | Khandaker et al. | |
| 2007/0198352 A1 | 8/2007 | Kannegiesser | |
| 2007/0198403 A1 | 8/2007 | Aloni et al. | |
| 2007/0233596 A1 | 10/2007 | Ambrose | |
| 2007/0244778 A1 | 10/2007 | Bailard | |
| 2007/0250380 A1 | 10/2007 | Mankoff | |
| 2007/0262140 A1 | 11/2007 | Long, Sr. | |
| 2007/0265957 A1 | 11/2007 | Advani et al. | |
| 2007/0265960 A1 | 11/2007 | Advani et al. | |
| 2007/0267479 A1 | 11/2007 | Nix et al. | |
| 2007/0271178 A1 | 11/2007 | Davis | |
| 2007/0282740 A1 | 12/2007 | Wendt | |
| 2008/0005001 A1 | 1/2008 | Davis et al. | |
| 2008/0040261 A1 | 2/2008 | Nix et al. | |
| 2008/0040265 A1 | 2/2008 | Rackley et al. | |
| 2008/0052189 A1 | 2/2008 | Walker et al. | |
| 2008/0059363 A1 | 3/2008 | Hotz et al. | |
| 2008/0065532 A1 | 3/2008 | De la Motte | |
| 2008/0091519 A1 | 4/2008 | Foss | |
| 2008/0103970 A1 | 5/2008 | Brooks | |
| 2008/0120129 A1 | 5/2008 | Seubert et al. | |
| 2008/0140561 A1 | 6/2008 | Neel | |
| 2008/0140568 A1 | 6/2008 | Henry | |
| 2008/0228643 A1 | 9/2008 | Hall | |
| 2008/0281734 A1 | 11/2008 | Longe et al. | |
| 2009/0048963 A1 | 2/2009 | Bishop et al. | |
| 2009/0063342 A1 | 3/2009 | Beckers | |
| 2009/0157220 A1 | 6/2009 | Walker et al. | |
| 2009/0164362 A1 | 6/2009 | Moore | |
| 2009/0164363 A1 | 6/2009 | Ahlers et al. | |
| 2009/0192934 A1 | 7/2009 | Chu et al. | |
| 2009/0222367 A1 | 9/2009 | Jenkins et al. | |
| 2009/0228307 A1 | 9/2009 | Sorbe | |
| 2009/0254431 A1 | 10/2009 | Crowe et al. | |
| 2010/0030687 A1 | 2/2010 | Panthaki et al. | |
| 2010/0057554 A1 | 3/2010 | Lanford | |
| 2010/0076875 A1 | 3/2010 | Ernst et al. | |
| 2010/0106555 A1 | 4/2010 | Mneimneh et al. | |
| 2010/0222132 A1 | 9/2010 | Sanford et al. | |
| 2010/0280949 A1 | 11/2010 | Van Rensburg | |
| 2010/0306104 A1 | 12/2010 | Johnson | |
| 2010/0312684 A1 | 12/2010 | Kemper et al. | |

FOREIGN PATENT DOCUMENTS

| | | | |
|---|---|---|---|
| EP | 0397512 | | 11/1990 |
| EP | 0397512 | A2 | 11/1990 |
| EP | 0619565 | | 10/1994 |
| EP | 0619565 | A1 | 10/1994 |
| EP | 0348932 | A2 | 5/1995 |
| JP | 2-238593 | | 9/1990 |
| JP | 2-238593 | A | 9/1990 |
| JP | 2-278495 | | 11/1990 |
| JP | 2-278495 | A | 11/1990 |
| JP | 3-100791 | | 4/1991 |
| JP | 3-100791 | A | 4/1991 |
| JP | 4-165588 | | 6/1992 |
| JP | 4-165588 | A | 6/1992 |
| KR | 2010010217 | | 2/2010 |
| WO | WO 86/02757 | A1 | 5/1986 |
| WO | WO8602757 | | 5/1986 |
| WO | WO 86/07647 | A1 | 12/1986 |
| WO | WO8607647 | | 12/1986 |
| WO | WO 88/03297 | A1 | 5/1988 |
| WO | WO8803297 | | 5/1988 |
| WO | WO 89/08899 | A1 | 9/1989 |
| WO | WO8908899 | | 9/1989 |
| WO | WO 91/09370 | A1 | 6/1991 |
| WO | WO9109370 | | 6/1991 |
| WO | WO 93/09515 | A1 | 5/1993 |
| WO | WO9309515 | | 5/1993 |
| WO | WO 94/10649 | A1 | 5/1994 |
| WO | WO9410649 | | 5/1994 |
| WO | WO 94/28498 | A1 | 12/1994 |
| WO | WO9428498 | | 12/1994 |
| WO | WO 95/03570 | A2 | 2/1995 |
| WO | WO9503570 | | 2/1995 |
| WO | WO 97/46986 | A1 | 12/1997 |
| WO | WO9746986 | | 12/1997 |
| WO | WO0060487 | | 10/2000 |
| WO | WO2007133315 | A2 | 11/2007 |
| ZA | 200709282 | | 10/2007 |

OTHER PUBLICATIONS

Jane Boon Pearlstine, Lenders, Borrowers Hook Up Over the Web: Prosper.com and Other Sites Provide Forum for Individual Bidders Willing to Offer Small Loans, Wall Street Journal, May 20, 2006.

United Nations Conference on Trade and Development, E-finance and Small and Medium-Size Enterprises (SMEs) in Developing and Transition Economies, UNCTAD Expert Meeting, Oct. 17, 2001.

Tim Jones, Paradigms Ioast, RSA Journal, Oct. 2006, pp. 28-31.

Diego Rumiany, Internet Bidding for Microcredit: making it work in the developed world, conceiving it for the developing world, Mar. 2007.

Stefan Heng, Thomas Meyer, and Antje Stobbe, Implications of Web 2.0 for financial institutions: Be a driver, not a passenger, Munich Personal RePEc Archive, Jul. 31, 2007.

Matt Flannery, Kiva and the Birth of Person to Person Microfinance, Innovations, pp. 31-56, Winter & Spring 2007.

Michael K, Hulme and Colette Wright, Internet Based Social Lending: Past, Present and Future, Social Futures Observatory, Oct. 2006.

Richard W. Coleman, Is the Future of the Microfinance Movement to be Found on the Internet?, International Trade and Finance Association Working Papers 2007.

Amanda Scott and Patrick Towell, The web we weave, Financial World, pp. 12-15, Nov. 2006.

Prosper, Access and Transparency through Person-to-Person Lending, FDIC Advisory Committee on Economic Inclusion, Mar. 28, 2007.

Co-pending U.S. Appl. No. 12/338,402, filed Dec. 18, 2008, titled "Transfer Account Systems, Computer Program Products, and Associated Computer-Implemented Methods".

Co-pending U.S. Appl. No. 12/338,440, filed Dec. 18, 2008, titled "Transfer Account Systems, Computer Program Products, and Associated Computer-Implemented Methods".

Co-pending U.S. Appl. No. 12/338,712, filed Dec. 18, 2008, titled "Computer-Implemented Methods, Program Product, and System to Enhance Banking Terms Over Time".

Co-pending U.S. Appl. No. 12/338,684, filed Dec. 18, 2008, titled "Transfer Account Systems, Computer Program Products, and Associated Methods".

Co-pending U.S. Appl. No. 12/338,497, filed Dec. 18, 2008, titled "Private Label Promotion Card System, Program Product, and Associated Computer-Implemented Methods".

Co-pending U.S. Appl. No. 12/338,540, filed Dec. 18, 2008, titled "Private Label Promotion Card System, Program Product, and Associated Computer-Implemented Methods".

Co-pending U.S. Appl. No. 12/338,584, filed Dec. 18, 2008, titled "Transfer Account Systems, Computer Program Products, and Methods to Prioritize Payments From Preselected Bank Accounts".

Co-pending U.S. Appl. No. 12/338,645, filed Dec. 18, 2008, titled "Transfer Account Systems, Computer Program Products, and Methods to Prioritize Payments From Preselected Bank Accounts".

Co-pending U.S. Appl. No. 12/338,365, filed Dec. 18, 2008, titled "Transfer Account Systems, Computer Program Products, and Associated Computer-Implemented Methods".

Co-pending U.S. Appl. No. 12/397,113, filed Mar. 3, 2009, titled "Person-to-Person Lending Program Product, System, and Associated Computer-Implemented Methods".
Co-pending U.S. Appl. No. 12/389,749, filed Feb. 20, 2009, titled "Methods to Advance Loan Proceeds on Prepaid Cards, Associated Systems and Computer Program Products".
Co-pending U.S. Appl. No. 12/417,199, filed Apr. 2, 2009, titled "System, Program Product, and Associated Methods to Autodraw for Micro-Credit Attached to a Prepaid Card".
Co-pending U.S. Appl. No. 12/417,211, filed Apr. 2, 2009, titled "System, Program Product, and Associated Methods to Autodraw for Micro-Credit Attached to a Prepaid Card".
Co-pending U.S. Appl. No. 12/417,182, filed Apr. 2, 2009, titled "System, Program Product, and Method to Authorize Draw for Retailer Optimization".
Co-pending U.S. Appl. No. 12/407,320, filed Mar. 19, 2009, titled "Computerized Extension of Credit to Existing Demand Deposit Accounts, Preparid Cards and Lines of Credit Based on Expected Tax Refund Proceeds, Associated Systems and Computer Program Products".
Co-pending U.S. Appl. No. 12/417,162, filed Apr. 2, 2009, titled "System, Program Product, and Method for Debit Card and Checking Account Autodraw".
Co-pending U.S. Appl. No. 12/367,187, filed Feb. 6, 2009, titled "Government Targeted-Spending Stimulus Card System, Program Product and Computer-Implemented Methods".
Co-pending U.S. Appl. No. 12/465,306, filed May 13, 2009, titled "System, Program Product, and Computer-Implemented Method for Loading a Loan on an Existing Pre-Paid Card".
Co-pending U.S. Appl. No. 12/465,803, filed May 14, 2009, titled "System, Program Product, and Method for Loading a Loan on a Pre-Paid Card".
Co-pending U.S. Appl. No. 12/465,277, filed May 13, 2009, titled "System, Program Product, and Computer-Implemented Method for Loading a Loan on a Pre-Paid Card".
Cross, Sam Y., All About . . . the Foreign Exchange Market in the United States, 1998, Federal Reserve Bank of New York.
International Search Report from co-pending PCT Application No. PCT/US2009/034692 dated Apr. 14, 2009.
International Search Report from co-pending PCT Application No. PCT/US2009/039495 dated May 18, 2009.
International Search Report from co-pending PCT Application No. PCT/US2008/087689 dated Jun. 17, 2009.
International Search Report from co-pending PCT Application No. PCT/US2009/039492 dated May 14, 2009.
International Search Report from co-pending PCT Application No. PCT/US2009/043988 dated Jul. 14, 2009.
International Search Report from co-pending PCT Application No. PCT/US2009/039512 dated Jun. 8, 2009.
International Search Report from co-pending PCT Application No. PCT/US2009/039504 dated May 27, 2009.
International Search Report from co-pending PCT Application No. PCT/US2009/043978 dated Jun. 30, 2009.
Co-pending U.S. Appl. No. 12/554,659, filed Sep. 4, 2009, titled "System, Method, and Program Product for Foreign Currency Travel Account".
Co-pending U.S. Appl. No. 12/554,432, filed Sep. 4, 2009, titled "System, Method, and Program Product for Retail Activation and Reload Associated with Partial Authorization Transaction".
Co-pending U.S. Appl. No. 12/626,349, filed Nov. 25, 2009, titled Machine, Methods, and Program Product for Electronic Inventory Tracking.
Co-pending U.S. Appl. No. 12/607,780, filed Oct. 28, 2009, titled Shopping Center Gift Card Offer Fulfillment Machine, Program Product, and Associated Methods.
International Search Report for PCT/US09/56072 dated Oct. 20, 2009.
Bank Deals—Best Rates and Deals: EverBank's World Currency CDs—My Interview with EverBank's Executive Frank Trotter, http://bankdeals.blogspot.com, Jul. 29, 2007.
Foreign Exchange Market, http://en.wikipedia.org.
Avoid Gift Card Pitfalls, ConsumerReports.org.

VIPGift Receives Investment From Summit Partners and Bridgescale Partners, Nov. 11, 2008, Chattanooga, TN and Palo Alto, CA.
Co-pending U.S. Appl. No. 12/562,331, filed Sep. 18, 2009, titled Computerized Extension of Credit to Existing Demand Deposit Accounts, Prepaid Cards and Lines of Credit Based on Expected Tax Refund Proceeds, Associated Systems and Computer Program Products.
Office Action dated Jul. 9, 2010 for U.S. Appl. No. 12/338,365.
Office Action dated Jul. 9, 2010 for U.S, Appl. No. 12/338,645.
Office Action dated Sep. 28, 2010 for co-pending U.S. Appl. No. 12/338,402, filed Dec. 18, 2008.
Office Action dated Sep. 3, 2010 for co-pending U.S. Appl. No. 12/417,162, filed Apr. 2, 2009.
Office Action in co-pending U.S. Appl. No. 12/417,162 dated Apr. 13, 2011.
Orszag, Peter, "Unemployment Insurance as an Economic Stimulus", Center for Budget and Policy Priorities, Nov. 15, 2011.
Powell, Robert L., "Statewide Electronic Commerce Program Status Report", State of North Carolina Office of the State Controller, Mar. 7, 2007.
Parrott, James, "Jittery Wall Street, Calm City?", Gotham Gazette, Apr. 16, 2007.
Zandi, Mark, "Washington Throws the Economy a Rope", Moody's Economy.com, Jan. 22, 2008.
Blair, Christine E., et al., "Challenges to the Dual Banking System: The Funding of Bank Supervision", FDIC Bank Review, Mar. 31, 2006.
Office Action for co-pending U.S. Appl. No. 12/367,187 dated Jun. 27, 2011.
"Developing Asia and the World", Asian Development Bank 2002.
Notice of Allowance in co-pending U.S. Appl. No. 12/554,659 dated Aug. 2, 2011.
Office Action in co-pending U.S. Appl. No. 12/338,712 dated Jul. 28, 2011.
Office Action in co-pending U.S. Appl. No. 12/338,440 dated Aug. 1, 2011.
Financial Advice Investment Money Oct. 1, 2009 at 5:50pm, HSBC Offshore Internet Banking.
Financial Advice Investment Money Oct. 1, 2009 at 7:25am, HSBC Offshore Internet Banking.
Co-pending U.S. Appl. No. 13/036,076, filed Feb. 28, 2011, titled Machine, Program Product, and Computer Implemented Method to Construct a Person-To-Person Loan.
Office Action dated Feb. 18, 2011, in co-pending U.S. Appl. No. 12/338,402.
Final Office Action dated Jan. 26, 2011, in co-pending U.S. Appl. No. 12/338,365.
Final Office Action dated Jan. 26, 2011, in co-pending U.S. Appl. No. 12/338,645.
Final Office Action dated Jan. 19, 2011, in co-pending U.S. Appl. No. 12/417,162.
Office Action dated Feb. 1, 2011, in co-pending U.S. Appl. No. 12/389,749.
Co-pending U.S. Appl. No. 12/814,405, filed Jun. 11, 2010 titled Environmental-Friendly Fuel Credit Card System, Program Product, and Computer-Implemented Methods.
Co-pending U.S. Appl. No. 12/877,490, filed Sep. 8, 2010 titled System, Program Product, and Method for Debit Card and Checking Account Autodraw.
Co-pending U.S. Appl. No. 12/877,524, filed Sep. 8, 2010 titled System, Program Product, and Method for Debit Card and Checking Account Autodraw.
Co-pending U.S. Appl. No. 12/562,331, filed Sep. 18, 2009 titled Computerized Extension of Credit to Existing Demand Deposit Accounts, Prepaid Cards and Lines of Credit Based on Expected Tax Refund Proceeds, Associated Systems and Computer Program Products.
Krino, Gary, et al., A Birthday Card That Pays Off, The Orange County Register, Jul. 19, 1996, 2 pages.
Cohen, Bruce, Alternative to Cash Gains Ground, The Financial Post, Apr. 22, 1994, 2 pages.

Bank of Boulder POS Debit Solution at the Table Now in Beta: First Bank to Certify IVI Spirit C2000 on MAPP (R), Business Wire, Aug. 3, 1994, 1 page.
Co-pending U.S. Appl. No. 12/700,681, filed Feb. 4, 2010.
Co-pending U.S. Appl. No. 12/889,281, filed Sep. 23, 2010.
Co-pending U.S. Appl. No. 12/892,847, filed Sep. 28, 2010.
Co-pending U.S. Appl. No. 12/731,852, filed Mar. 25, 2010.
MicroTrax Ltd., PC Electronic Payment Systems Reference Manuel, 1995 (381 pages).
John P. Caskey and Gordon H. Selton, Jr., Is the Debit Card Revolution Finally Here?, Federal Reserve Bank of Kansas City, Economic Review, Fourth Quarter 1994, pp. 70-95, vol. 79 #4 (17 pages).
Laura Castaneda, Business Promote Services to Customers Day In and Day Out, The Dallas Morning News, Nov. 26, 1994, 3 pages.
Margaret Mannix, Checkout Tech, U.S. News & World Report, Feb. 27, 1995, 6 pages.
Credit Terminals to be Used at Canadian Liquor Outlets, Card News, Jan. 23, 1995, 1 page.
Debit Card Popularity on the Rise, Chain Store Age Executive, Jan. 1994, 1 page.
Debit Goes to Dinner, Credit Card Management, New York, Oct. 1994, 2 pages.
Alan Peppard, Down and Dirty in Deep Ellum, The Dallas Morning News, Dec. 3, 1994, 2 pages.
Everest Reference Manual, VeriFone Part No. 25399, Revision A, Manual Revision 1.0, Jul. 1995, 66 pages.
Express Cards and Trains, Chain Store Age Executive Edition, Jan. 1995, 1 page.
Suzanne Brown, Goodnight Amy, Meg, Beth and Jo, Rocky Mountain News, Dec. 8, 2994, 1 page.
Robert J. Klein, Here Comes the Debit Card, D&B Reports, Jul./Aug. 1990, 2 pages.
Hypercom S7C Advertisement, Chain Store Age, Sep. 1995, 4 pages.
Hypercom S7SC Advertisement, Chain Store Age, Feb. 1996, 2 pages.
IBM 4680-4690 Advanced Payment System for Chain Drug Sales Application User's Guide, Nov. 1996, 256 pages.
IBM 4680-4690 Advanced Payment System for Chain Drug Sales Application User's Guide, Jul. 1996, 248 pages.
IBM 4680-4690 Advanced Payment System for Supermarket Application User's Guide, Sep. 1996, 222 pages.
Fox, Linda A., Keep an Eye on Your Credit Card, The Toronto Sun, Aug. 9, 1996, 1 page.
Pyatt, Rudolph A., Jr., Mobil Stations to Permit Use of Bank Cards, The Washington Post.
NCR 4430-5000 MSR/PIN User's Guide, 1994, 265 pages.
Nieman Marcus: High-Tech for the Holidays, ADWEEK, Dec. 5, 1994, 1 page.
Neiman Marcus Offers Electronic Gift Certificate, Card Fax, Jan. 23, 1995, 1 page.
Neiman Marcus to Lauch NM Express Automated Gift Card, PR Newswire, Nov. 22, 1994, 1 page.
NM Express Card Advertisement, The New Yorker, Dec. 12, 1994, 3 pages.
Service Mark Registration No. 1,981,044 for "NM Express Card", registered Jun. 18, 1996, 1 page.
Omni 480/490 Programmer's Guide, VeriFone Part No. 12924—Revision A, Manual Revision 1.0, Oct. 1993, 228 pages.
One Company's Diversification Shakes Up Peripherals Market, Chain Store Age, Jun. 1996, 3 pages.
O'Keefe, Michael, Portable POS Debit Terminal Mean Greater Convenience, Bank Systems & Technology, Nov. 1994, 2 pages.
POS Terminal Can Handle Direct Debits, ABA Banking Journal, Sep. 1984, 2 pages.
Racal Corp. Advertisement, POS Terminal Eliminates Credit Card Vouchers, ABA Banking Journal, Nov. 1985, 2 pages.
Szabo, Joan C., The Changing World of Financial Services, Nation's Business, Oct. 1994, 7 pages.
VeriFone Everest Advertisement, Stores, May 1995, 2 pages.
VeriFone Folio (TM) Brings Credit and Debit Card Payment to the Restaurant Table, PR Newswire, May 16, 1994, 3 pages.

David B. Barnes, VeriFone Introduces Everest (TM) Customer Activated Payment System to Multi-Lane Retail Market, PR Newswire, Feb. 20, 1995, 2 pages.
VeriFone Introduces Pinpad (TM) 1000 to Point-of-Sale Debit Market, M2 Presswire, Apr. 21, 1995, 1 page.
VeriFone TCL Terminal Control Language Programmer's Manual, VeriFone Part No. 00368-01, Revision G, Manual Revision 8.0, Aug. 1992, 362 pages.
VeriFone Tranz 330 Reference Manual, Verifone Part No. 00483—Revision D, Manual Revision 3.01, Apr. 1990, 144 pages.
MicroTrax Ltd. Omni 490M (and 490ML) Operation Manual for Integrated and Non-Integrated Configurations, 1994, 60 pages.
MicroTrax Electronic Payment Systems: The MicroTrax Pinstripe Lane Equipment Users Guide, MicroTrax Ltd., Newport Beach, CA 1991, 54 pages.
IBM 4680-4690 Supermarket Application—Electronic Funds Transfer Feature Enhancement: User's Guide, IBM Corp., Research Triangle Park, NC, Sep. 1995, 318 pages.
IBM 4680 General Sales Application Electronic Funds Transfer User's Guide, IBM Corp., Research Triangle Park, NC, Dec. 1990, 260 pages.
IBM 4680 General Sales Application Electronic Funds Transfer User's Guide, IBM Corp., Research Triangle Park, NC, Mar. 1991, 263 pages.
IBM 4680 General Sales Application: Guide to Operations, Research Triangle Park, NC, Jun. 1991, 429 pages.
Office action.from co-pending U.S. Appl. No. 12/338,497 dated Aug. 18, 2011.
Notice of Allowance of co-pending U.S. Appl. No, 12/417,199 dated Aug. 18, 2011.
Notice of Allowance of co-pending U.S. Appl. No. 12/417,211 dated Aug. 22, 2011.
Wolfe, Daniel, "An E-Variation on Payday Loan Theme", American Banker, Jul. 28, 2005.
"Letter of Credit Explained: What is Letter of Credit?", Dec. 26, 2005, pp. 1-2 (Office Action from co-pending U.S. Appl. No. 12/338,540 dated Sep. 1, 2011).
Office Action from co-pending U.S. Appl. No. 12/338,540 dated Sep. 1, 2011.
Notice of Allowance of co-pending U.S. Appl. No. 12/338,365 dated Sep. 1, 2011.
Office Action dated Mar. 4, 2011, in co-pending U.S. Appl. No. 12/338,684.
Office Action dated Mar. 17, 2011, in co-pending U.S. Appl. No. 12/417,199.
Office Action dated Mar. 17, 2011, in co-pending U.S. Appl. No. 12/465,803.
Office Action dated Mar. 22, 2011, in co-pending U.S. Appl. No. 12/338,584.
Office Action dated Mar. 29, 2011, in co-pending U.S. Appl. No. 12/417,211.
Office Action dated Mar. 29, 2011, in co-pending U.S. Appl. No. 12/407,320.
Final Office Action dated Jan. 26, 2011, in co-pending U.S. Appl. No. 12/338,365.
Final Office Action dated Jan. 26, 2011, in co-pending U.S. Appl. No. 12/338,645.
Final Office Action dated Jan. 19, 2011, in co-pending U.S. Appl. No. 12/417,162.
Final Office Action in co-pending U.S. Appl. No. 12/338,584 dated Sep. 15, 2011.
Final Office Action in co-pending U.S. Appl. No. 12/338,684 dated Sep. 23, 2011.
Lazarus, David, "120% rate for Wells' Advances", Oct. 16, 2004, San Francisco Chronicle (Final Office Action in co-pending U.S. Appl. No. 12/338,684 dated Sep. 23, 2011).
Office Action in co-pending U.S. Appl. No. 12/397,113 dated Sep. 30, 2011.
Notice of Allowance in co-pending U.S. Appl. No. 12/338,645 dated Oct. 3, 2011.
Office Action in co-pending U.S. Appl. No. 12/417,182 dated Sep. 28, 2011.

Office Action from co-pending U.S. Appl. No. 12/626,349, dated Nov. 22, 2011.
Zubko, N., "An Automatic Connection Electronic Transaction Tools Help Manufacturers Connect with Suppliers to Streamline Sourcing Efforts", Industry Week, Jul. 2008, pp. 26-27, vol. 257, No. 7.
Notice of Allowance from co-pending U.S. Appl. No. 12/609,896 dated Oct. 27, 2011.
Office Action from co-pending U.S. Appl. No. 12/465,277 dated Oct. 20, 2011.
Office Action from co-pending U.S. Appl. No. 12/562,331 dated Oct. 20, 2011.
Notice of Allowance from co-pending U.S. Appl. No. 12/407,320 dated Oct. 18, 2011.

* cited by examiner

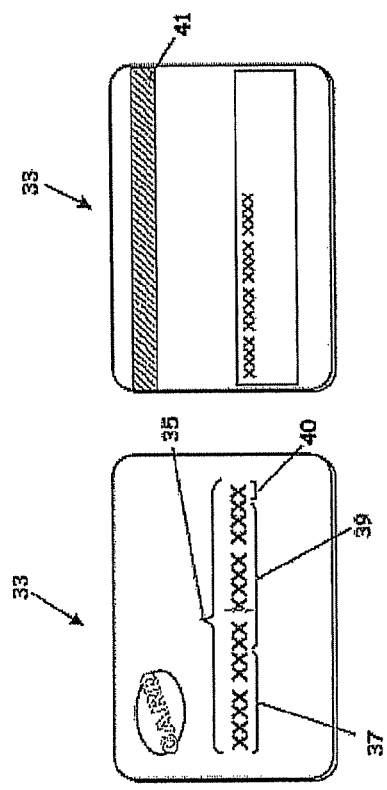
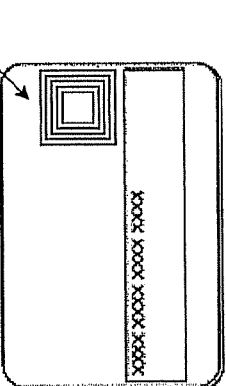
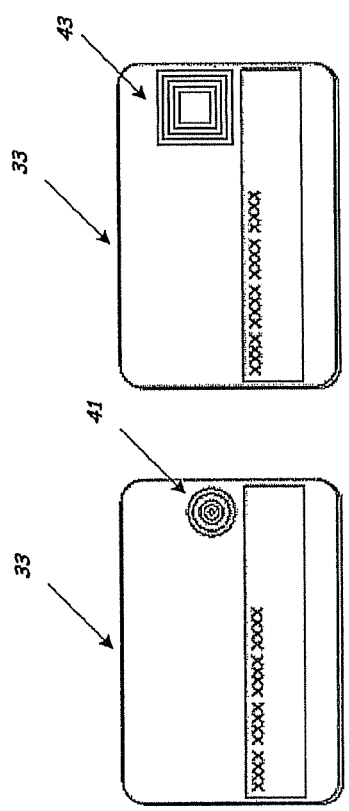
FIG. 2.
FIG. 3.
FIG. 3A.
FIG. 3B.

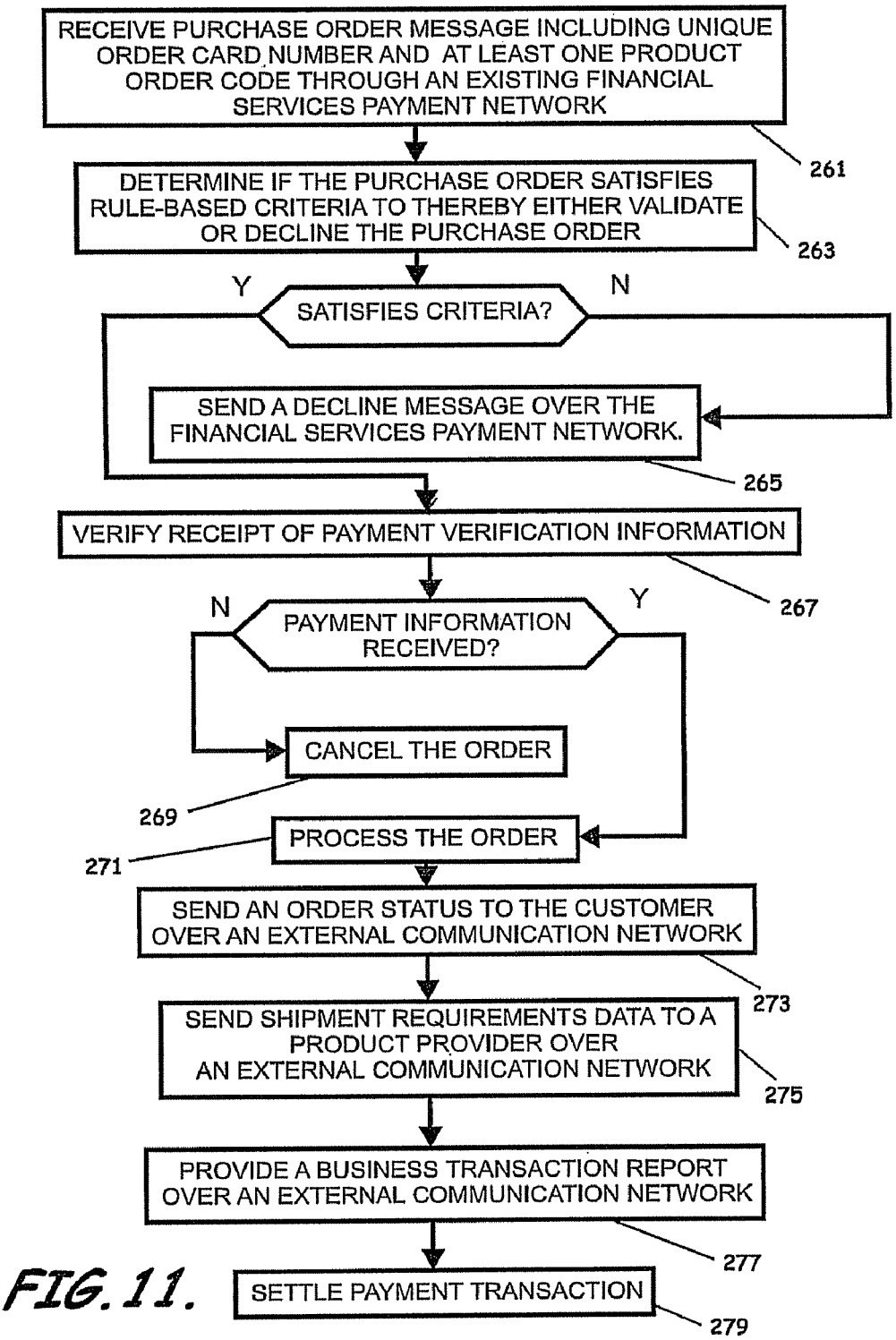

MACHINE, METHODS, AND PROGRAM PRODUCT FOR ELECTRONIC ORDER ENTRY

This application is related to U.S. Provisional Patent Application No. 61/110,319, filed Oct. 31, 2008, titled "System, Methods, and Program Product for Electronic Order Entry" and U.S. Non-Provisional patent application Ser. No. 12/554,432, filed Sep. 4, 2009, titled "System, Method, and Program Product for Retail Activation and Reload Associated with Partial Authorization Transactions," each incorporated herein by reference in its entirety.

BACKGROUND OF THE INVENTION

1. Field of the Invention

The present invention relates generally to electronic order entry. More specifically, the present invention relates to systems, program product, and methods related to electronically order goods, services, or goods and services (collectively and individually defining products) through messaging over existing financial services electronic payment networks.

2. Description of the Related Art

As computers continue to become faster and faster and as database access and database management continue to improve, the prospects of, and the desire for, instituting viable and cost-effective electronic order entry systems, either internally or over the Internet, has also continued to improve. A conventional application of an electronic ordering machine is that shown by various companies having online retail and wholesale stores, many of which have moved away entirely from brick and mortar establishments to near exclusive Internet-based sales. Such electronic ordering allows direct entry of orders into fields displayed on a graphical user interface by customers, reducing transcription errors, reducing transaction costs, allowing for expedited receipt, documentation, and processing of such orders.

Certain industries, however, continue to resist application of electronic ordering systems. For example, with respect to hospital systems for ordering medications, tests and other services electronically, one study found that fewer than 15 percent have been able to implement such systems. In such industries, it has been found that resistance from key personnel has resulted in such inability to effectively implement such systems. Although there are several reasons, the most prominent appears to be a perception that the key personnel are being transferred clerical duties, which could better be performed through use of paper order systems and/or performed by others. It is believed that attempted implementation of any ordering systems that would provide for electronic ordering of sample medications would result in even worse implementation success statistics.

Application of electronic ordering systems has also faced other difficulties. For example, the ordering system is implemented through use of a telephonic ordering system, e.g., landline or cellular, there is not only the labor cost of having a sales representative receive and enter the order in the computer portion of the electronic ordering system, but there is the problem with transcription errors. Systems that allow the customer to directly enter the orders in a computer can help reduce such problems associated with transcription errors. Such systems, however, do not necessarily have the same accessibility provided by manned telephonic systems.

As prolific as computers have been in recent years, many potential customers either do not have ready access to on-line computers, do not have the desire to learn how to use online catalogs, or simply do not have the time to login, view an online catalog, place the item in an electronic shopping cart, and enter data to execute the order, etc. These same potential customers, however, typically know and understand entering numeric data into a merchant point-of-sale payment terminal and entering data into a telephonic keypad for selecting a service.

Accordingly, there is a need for an automated machine, program product, and method of facilitating electronic ordering of goods, services, or goods and services, that utilize a familiar merchant point-of-sale terminal or telephonic device for electronically entering orders, which does not require use of an operator to receive the orders, and which does not require individual orders to be placed through a conventional online computer system.

SUMMARY OF THE INVENTION

In view of the foregoing, embodiments of the present invention advantageously provide systems, program product, and methods of facilitating electronic ordering of goods, services, or goods and services, through messaging over an existing financial services electronic payment network. Embodiments of the present invention advantageously provide a service that enables a business or consumer to order goods and/or services by entering traditional credit card identification data associated with a traditional financial services electronic payment network, e.g., MasterCard®, Visa®, American Express®, or Discover® network, and keying in an alphabetic, numeric, or alphanumeric, etc, code associated with that product. Advantageously, such service can be offered by any business and can be made available anywhere that the associated financial services electronic payment network is available.

More specifically, an example of an embodiment of a method of facilitating electronic ordering of goods, services, or goods and services collectively and individually defining products, through messaging over an existing financial services electronic payment network, can include the steps of providing a plurality of product order codes in a catalogue or listing, for example; associating each of the plurality of product order codes with a different product; forming a product identification medium including identification indicia for each of the plurality of products presented in association with a corresponding plurality of product order codes; and assigning an electronic order electronic order card a unique electronic order card identifier often referred to as a Primary Account Number ("PAN") which includes a non-financial transaction bank identification number ("BIN") also interchangeably referred to as an issuer identifier number ("IIN") and a customer account number for distribution to a prospective customer. The electronic order card can be configured to interface with a conventional point-of-sale terminal (e.g., through use of a magnetic stripe) to enable electronic ordering over the existing financial services electronic payment network using the electronic order card and at least one of the plurality of product order codes.

Another example of an embodiment of a method of facilitating electronic ordering of goods, services, or goods and services collectively and individually defining products, through messaging over an existing financial services electronic payment network, can include the steps of receiving a purchase order message sent through the financial services electronic payment network. The purchase order message can include a unique electronic order card identifier containing a non-financial transaction IIN and a customer number; and can include at least one of a plurality of product order codes indicating selection of a corresponding at least one of a plurality of different products to define at least portions of a purchase order. Swiping a magnetic stripe of the transaction card, or manually entering in the electronic order card identifier, along with entering a product order code in the payment amount field, can initiate the transmission of a purchase order message. The message is routed through the financial services electronic payment network according to the IIN portion of the card identifier, and is correspondingly received by a computer configured to process the purchase order. The computer determines if the purchase order satisfies rule-based criteria to thereby either validate or decline the purchase order, and either sends a decline message over the financial services electronic payment network if the purchase order fails the rule-based criteria, or processes the purchase order if the purchase order satisfies the rule-based criteria, assuming any payment verification requirements are met.

The method can also include, generally as a prerequisite to placing an order, the steps of distributing the electronic order electronic order card containing the unique electronic order card identifier along with a product identification medium including the plurality of product order codes, receiving customer electronic order registration activation information for an electronic order transaction card, and enabling electronic ordering over the financial services electronic payment network using the electronic order card when presented with at least one of the plurality of product order codes.

An example of an embodiment of a machine for facilitating electronic ordering of goods, services, or goods and services collectively and individually defining products, through messaging over an existing financial services electronic payment network, can include an electronic order card having a unique financial services open electronic payment network compatible card number ("an electronic order card number") including an IIN and a unique customer account number, and a plurality of product order codes each separately identifying a separate one of a plurality of goods or services. The machine can also include an issuer processor computer server positioned to receive a purchase order message containing non-financial electronic purchase order information including at least portions of the electronic order card number and at least one order code received through an existing financial services open electronic payment network, from a merchant acquirer server which is in communication with the issuer processor computer through the payment network to route the purchase order message between the customer and an electronic order card issuer.

The machine can further include a member interface protocol computer positioned to receive and process the purchase order message, and an electronic order entry program product stored on a tangible computer medium that is readable by the member interface protocol computer. The electronic order entry program product can include a set of instructions that, when executed by the interface protocol computer, cause the member interface protocol computer to perform the operations of: receiving the purchase order message, determining if the purchase order satisfies rule-based criteria to thereby either validate or decline the purchase order, processing the purchase order if the purchase order satisfies the rule-based criteria, and sending a decline message over the financial services electronic payment network if the purchase order fails the rule-based criteria.

An example of an embodiment of an electronic order entry program product to facilitate electronic ordering of goods, services, or goods and services collectively and individually defining products, through messaging over an existing financial services electronic payment network, e.g., MasterCard®, Visa®, American Express®, or Discover®, or other such networks, can include a set of instructions that, when executed by a computer, cause the computer to perform the operations of: receiving through an existing financial services electronic payment network, a purchase order message including a unique electronic payment network compatible electronic order card identifier associated with a physical or virtual electronic order card and at least one of a plurality of product order codes each associated with a different product defining at least portions of a purchase order, determining if the purchase order satisfies rule-based criteria to thereby either validate or decline the purchase order, sending a decline message over the financial services electronic payment network if the purchase order fails the rule-based criteria, and processing the purchase order if the purchase order satisfies the rule-based criteria.

Advantageously, the unique electronic order card identifier is associated with a physical electronic payment network compatible transaction card, and includes a non-financial transaction IIN and a customer identification number associated with a specific customer. Accordingly, advantageously, the electronic order card is configured to interface with a point-of-sale terminal to enable electronic ordering over the existing financial services electronic payment network using the electronic order card and a product order code.

BRIEF DESCRIPTION OF THE DRAWINGS

So that the manner in which the features and advantages of the invention, as well as others, which will become apparent, may be understood in more detail, a more particular description of the invention briefly summarized above may be had by reference to the embodiments thereof, which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 2 is a perspective view of the front of an electronic order card according to an embodiment of the present invention;

FIGS. 3, 3A, and 3B are perspective views of the back of an electronic order card according to embodiments of the present invention;

FIG. 11 is a schematic flow diagram illustrating steps associated with performing a payment required electronic order entry using an electronic order card and product order codes and processing the electronic order according to an embodiment of the present invention;

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

As prolific as computers have been in recent years, many potential customers, e.g., key personnel associated with certain industries, continue to resist application of electronic ordering systems. Although there are several reasons, the most prominent appears to be a perception that the key personnel are being transferred clerical duties, which could better be performed through use of paper order systems and/or be better performed by others. Such key personnel simply do not have the time to login, view a catalog, place the item in an electronic shopping cart, and enter data to execute the order, etc. It is expected that this would also be the case for online ordering of products in the form of either goods or services. These same key personnel, however, are very familiar and comfortable with entering, e.g., numeric data into a merchant point-of-sale payment terminal and/or entering data into a telephonic keypad for selecting a service. Accordingly, as described in more detail below, various embodiments of the present invention provide a system, program product, and method of facilitating electronic ordering of goods, services, or goods and services, that utilize the familiar merchant point-of-sale +terminal or telephonic device for electronically entering orders, which beneficially does not require individual orders to be placed through a conventional online computer system.

Figure 1:
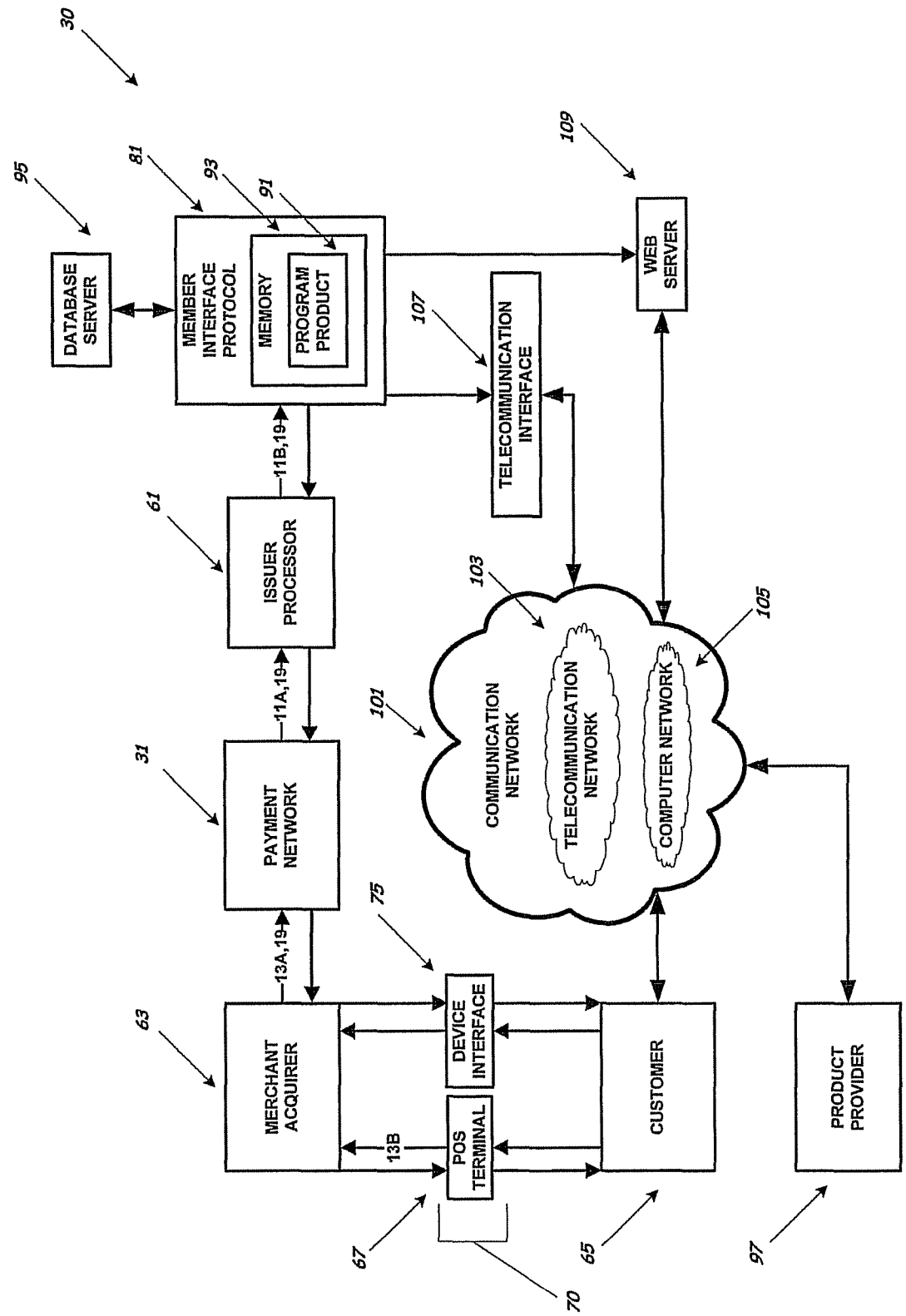
FIG. 1 is a schematic diagram of a general machine architecture of a machine for facilitating electronic ordering of goods, services, or goods and services, through messaging over a financial services electronic payment network according to an embodiment of the present invention.

As perhaps best shown in FIG. 1, a machine 30 for facilitating electronic ordering of goods, services, or goods and services (collectively and individually defining product or products), through either traditional or partial authentication messaging over an existing (traditional) financial services electronic payment network 31, e.g., MasterCard®, Visa®, American Express®, or Discover® network, etc., as known to those skilled in the art, is provided. As can be seen, the machine 30 includes a product provider computer 97; an electronic payment network interface 70 for receiving order information from a customer, a merchant acquirer computer 63 for accepting the order and facilitating communication of the order; a payment network 31 provided to identify an issuer associated with the order; an issuer processor computer for processing the order, and a member interface protocol computer 81 for executing the instructions for facilitating ordering the products from the product provider 97 through communications network 101. As one skilled in the art will appreciate, the merchant acquirer, payment network, and issuer processor computer are component of a traditional payment transaction system that enables credit transactions with a merchant, e.g., consumer credit card and debit card systems, and as such, machine 30 can process payment information in addition to and in conjunction with the order.

Communication network 101 connects the customer 65 to the merchant acquirer computer 63, payment network 31, issuer processor computer 61, the member interface protocol computer 81 and the product provider 97 (though the communications network 101 is depicted connecting only the customer 65, product provider 97 and member interface protocol computer 81) and can include, for example, a telecommunication network, which can include a wire-based telephone network, pager network, cellular network, or a combination thereof, and a computer network. As one skilled in the art will appreciate, the computer network can connect all of the system components using a local area network ("LAN") or wide area network ("WAN"), or a combination thereof. For example, payment network 31, issuer processor computer 61, and member interface protocol computer 81 may be associated with the same entity and are thereby configured as a plurality of servers operating together in a LAN. Alternatively, the merchant acquirer and payment network may be the same entity and operate together using a LAN, but use a WAN to connect to the issuer processor computer 61. Accordingly, though not all such configurations are depicted, all are within the scope of the disclosure.

Figure 5:
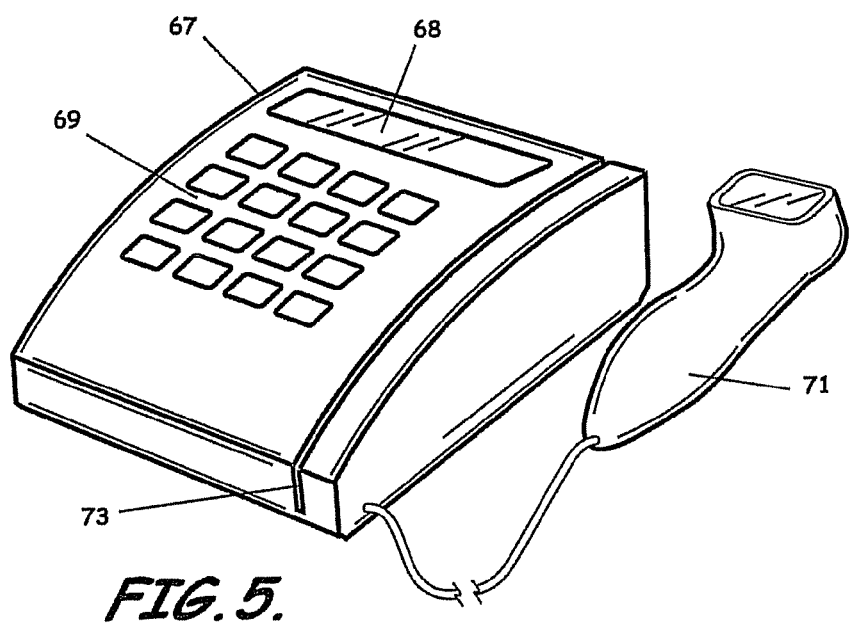
FIG. 5 is a perspective view of a merchant point-of-sale terminal adapted to interface with the electronic order card according to an embodiment of the present invention.

Customer 65 can be an individual or a business having access to the payment network interface 70, and initiates the product order by accessing the machine 30 using same. The payment network interface 70 includes, for example, a point of sale terminal ("POS") 67 and device interface 75, which could be a telephone or computer internet connection. As shown in FIG. 5, the merchant POS terminal 67 can include a keypad 69 so that a customer can enter an electronic order card number; a barcode scanner 71 (so the merchant can scan a barcode associated with the order, a product, or a portion of an electronic order card); and a magnetic stripe reader/slot 73 (so the merchant or customer can scan a magnetic stripe on the electronic order card. Alternative embodiments of the merchant POS terminal 67 can include an RFID interface (not shown) and/or a contact memory button reader (not shown). The merchant POS terminal 67, part of a merchant POS terminal 67 (not shown in its entirety) further includes various software and hardware for interfacing with the merchant acquirer computer 63, financial services electronic payment network 33, and issuer processor computer 61, as known and understood by those skilled in the art. For example, the POS terminal 67 may include a computer display screen (not shown) for displaying transaction data, a computer memory such RAM, ROM and related hard disk storage for storing transaction data or computer instructions, a computer processor for executing computer instruction, and associated buses for data input and output, including those to connect the POS terminal 67 to the LAN or WAN for interaction with the machine 30.

In a preferred embodiment, a user enters order information using, e.g., an electronic order card 33 similar to either a traditional credit/debit card or consumer loyalty card, and optionally, a product identification medium 51. An exemplary electronic order card 33 is shown in FIGS. 2-3B. In one configuration, the electronic order card 33 can be in the form of a standard 30-mil plastic card with magnetic stripe 41 (FIG. 3) that functions on at least one of the traditional financial services electronic payment networks 31. The electronic order card 33 can include unique financial services electronic payment network compatible card identifier number ("electronic order card number") 35 embossed on the front side of the electronic order card 33, which can identify the electronic order card number when device interface 75 is used to access the system. The electronic order card number 35 may include an issuer identification number ("IIN") 37, i.e., a six digit number used to identify the bank or issuer in alphanumeric symbols used for routing messages, a unique personal customer account number 39 used for identifying a specific customer, and a checksum digit 40. The IIN 37 can be either financial (is associated to a consumer account to monetarily settle transactions) or non-financial (is associated with a consumer account, but will settle non-monetary transaction.

Figure 4:
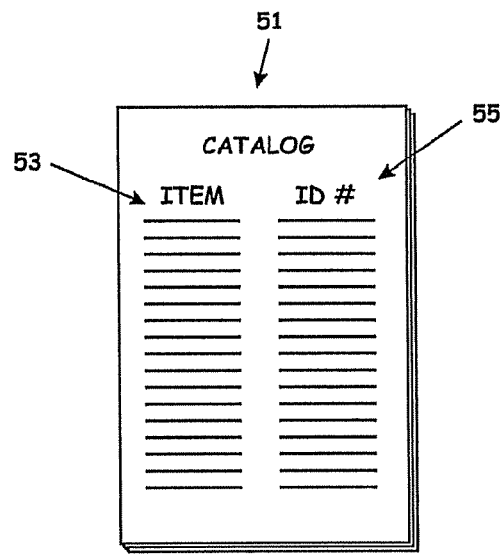
FIG. 4 is a schematic diagram of a catalog listing product order codes according to an embodiment of the present invention.

As shown in FIGS. 3, 3A, and 3B, the electronic order card 33 can also include a storage medium illustrated in the form of a magnetic stripe 41. Other storage medium configurations include, for example, radiofrequency identification ("RFID") tag 43, contact memory button 42, etc., capable of storing the electronic order card number 35 for transmission/retrieval by a merchant customer interface point-of-sale terminal 67 (FIG. 1). In each of the embodiments of the electronic order card 33, the various card storage media may store a copy of the electronic order card number 35, a customer name, expiration date, a network identifier, etc, in electronic or magnetic format. For example, the magnetic stripe 41 may store data on three separate tracks, tracks one and two, which are traditionally read only tracks, could store the account number, customer name, card expiration date, etc., and track three, traditionally a read/write track, could allow data to be written to the magnetic stripe, e.g., identification of promotional offers, flags that the order card has been associated with a discount offer, etc. However, as one skilled in the art will recognize, in alternative embodiments, the identification number may be the only thing stored in the various card storage media, or the electronic order card 35 may be a "smart card" to allow various data to be written and stored thereon, e.g., identification of promotional offers, flags that the order card has been associated with a discount offer, etc The customer 65 can interact with the POS or device interface 75 using, e.g., the electronic order card number 35 in conjunction with, e.g., a product identification medium 51 such as, for example, a table, list, catalogue, or other medium for conveying product data to a customer 65, for order placement, shown in FIG. 4 The product identification medium 51 can include a list of particular goods, services, or both goods and services (collectively referred to as "product" or "products" 53) differentiated by type, size, quantity, delivery mode, etc. For example, a 10-day supply of pharmaceutical A can be listed separately for selection than a 30-day supply of pharmaceutical A. Similarly, a 10-day supply of pharmaceutical A to be hand delivered by a sales clerk can be listed separately from a 10-day supply of the same pharmaceutical A to be delivered via mail order. The product identification medium 51 can also include a corresponding list of product identification ("order") codes 55 each separately identifying a different "listed" product.

The order codes 55 can each include a unique series of numbers, letters, or both, a code scheme, an arrangement of characters, bar code, etc. to thereby identify a specific product, and the customer can enter such numbers during order placement. As one skilled in the art will appreciate, the order codes can be entered using, e.g., the keypad located on the POS terminal or telecommunications device, or alternatively the scanning device 71 can be used a bar code corresponding to the product order code, to enter same. As such, the order code is appended to the electronic order card number 35, or other identification mechanism. In addition, both the electronic order card number 35 and the order code 55 may be temporarily stored in the POS or a merchant computer for transmittal to the merchant acquirer in a single batch or word, or the electronic order card number 35 and the order code 55 may be transmitted separately with an additional signal that indicates any one of the start of the electronic order card number 35, the end of the electronic order card number 35; the start of the order code 55; the end of the order code 55, and the merchant name.

In an alternate methodology, the customer 65 can interface with the merchant acquirer computer 63 via a device interface 75 such as a conventional touch-tone telephone, a cellular telephone (not shown), personal computer, wireless personal digital assistant (not shown), etc. Here, the customer would telephonically connect to an electronic interface at the merchant acquirer computer 63, and provide, e.g., the electronic order card number 35 and the order code 55. For example, the customer might be able to have the merchant acquirer computer 63 electronically recognize and convert a voice order signal into electronic data to be transmitted to the other computer components of the system. Alternatively, the customer might interact with a person associated with the merchant acquirer computer 63 that manually enters the electronic order card number 35 and the order code 55 into the merchant acquirer computer 63, payment network 31, issuer processor 61, or member interface protocol 81.

Once the customer provides order card number 35 and the order code 55 to, e.g., the payment network interface 70, the data is encrypted and transmitted through the communications network 101 to the merchant acquirer computer 63. The merchant acquirer computer is both configured and positioned in communication with the issuer processor computer 61 through the financial services electronic payment network 31, and decrypts the electronic order card number 35 and the order code 55, and appends additional data there to for transmission to the payment network 31. As one skilled in the art will recognize, in addition to transmitting the electronic order card number 35 and the order code 55, the merchant acquirer could also transmit settlement data to the payment network so that the merchant or product provider 97 can receive payment in conjunction with the order. To perform these duties, merchant acquirer computer 63, for example, consists of at least one computer, though it can be implemented as one or more computers each having a processor and memory coupled to the processor to store operating instructions therein, which can be configured in the form of a server.

The merchant acquirer computer 63 transmits the electronic order card number 35 and the order code 55 to the payment network 31, which operates to set transaction rules, facilitate transactions, settles funds between parties, engages in risk mitigation etc. Examples of payment networks 31 are e.g., MasterCard®, Visa®, American Express®, or Discover® network. At the payment network 31, the electronic order card number 35 and the order code 55 are decrypted so that the issuer can be identified using the IIN, and the electronic order card number 35 and the order code 55 are then routed to the appropriate issuer 61. The payment network 31 can be configured as one or more computers each having a processor and memory coupled to the processor to store operating instructions therein, which can be configured in the form of a server.

The payment network 31 routes the electronic order card number 35 and the order code 55, which may be encrypted before transmission, to the issuer processor computer 61. The issuer processor computer 61 traditionally funds transactions, i.e., bills the customer a charge, and can be e.g., a bank. Here, in addition to settling merchant accounts, the issuer processor computer 61 transmits order data, using for example, the electronic order card number 35 and the order code 55, for order processing by a member interface protocol computer 81. To achieve this end, the issuer processor computer 61, can be implemented as one or more computers each having a processor and memory coupled to the processor to store operating instructions therein, which can be configured in the form of a server.

The issuer processor computer 61 sends the electronic order card number 35 and the order code 55 to the member interface protocol computer 81. Member interface protocol computer 81 performs many of the functions of the machine related matching and associating an order to a customer account, associating the order with a product provider 97; facilitating the order with the product provider 97 and communicating an order status to the customer 65. To achieves this, member interface protocol could be configured as an application server or plurality of application servers connected to and as a part of the issuer processor computer 61 and accessible by a plurality of workstations associated with the issuer processor computer 61, as shown in FIG. 14.

It should also be understood that the illustrated merchant acquirer computer, payment network, issuer processor computer and member interface protocol computer configuration is given by way of example and that other types of servers or computers configured according to various other methodologies known to those skilled in the art, can be used. For example, a single computer, a plurality of computers, a server or server cluster or server farm may be employed, and this disclosure does not limited any configuration of computers and servers for each. Moreover each may be deployed as at a server farm or server cluster managed by a server host, and the number of servers and their architecture and configuration may be increased based on usage, demand and capacity requirements for the machine 30

Figure 14:
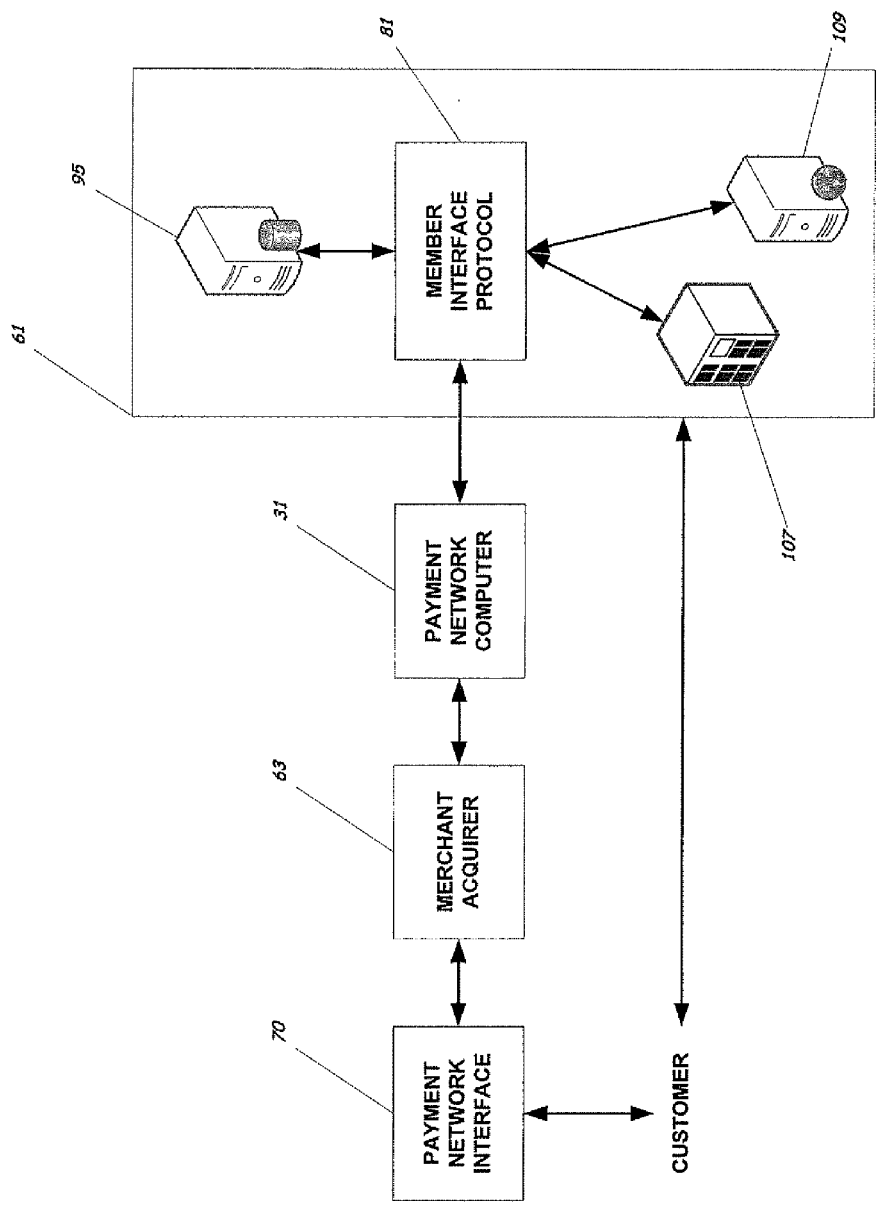
FIG. 14 is a schematic diagram of a general system architecture of a machine for facilitating electronic ordering of goods, services, or goods and services, through messaging over a financial services electronic payment network according to an embodiment of the present invention.

As shown in FIGS. 1 and 14, the member interface protocol computer 81 connects to a database server 95, telecommunications interface 107 and web server 109.

Figure 15:
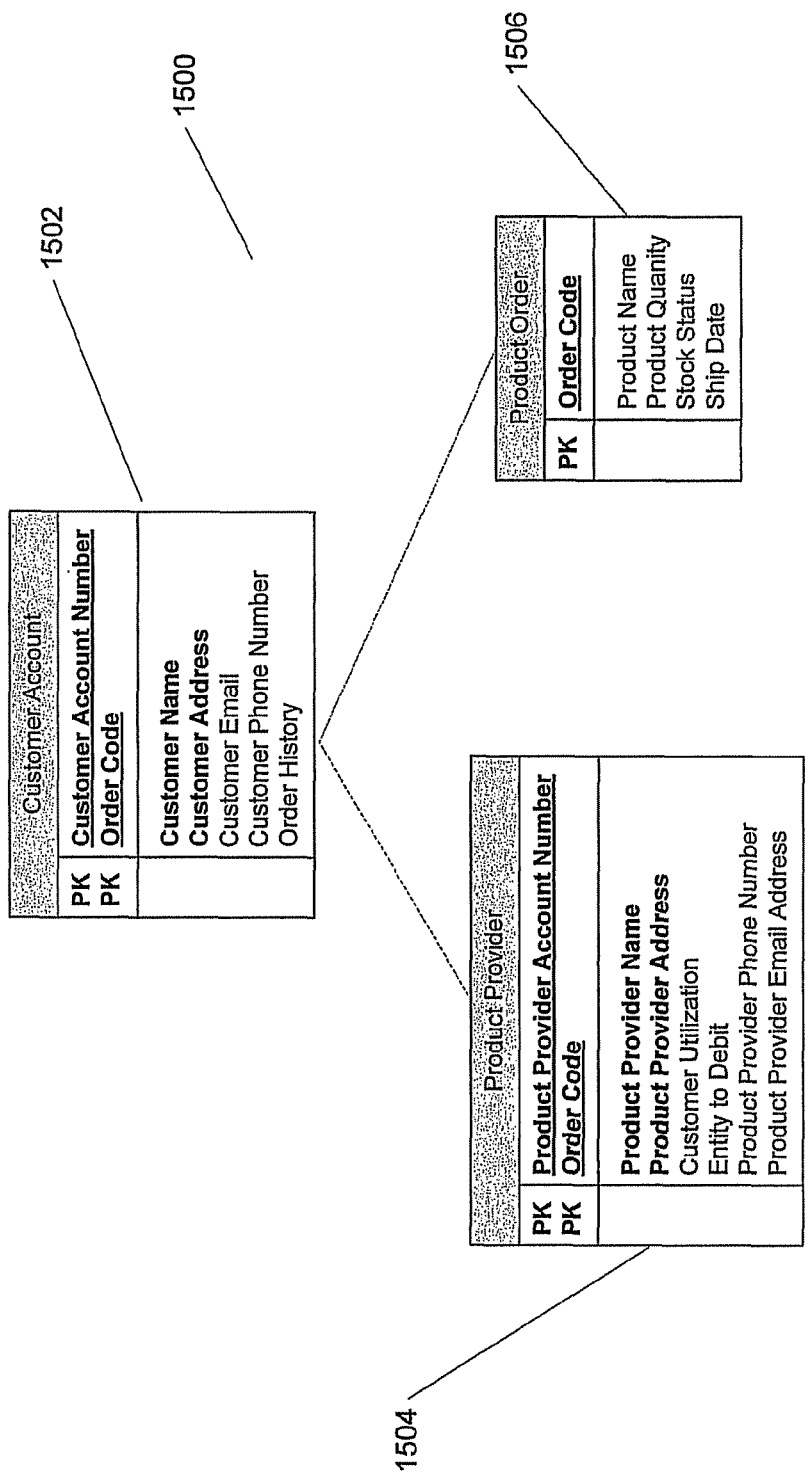
FIG. 15 is a schematic diagram of a database and database tables of a machine for facilitating the electronic ordering of goods, services or goods and services, through messaging over a financial services electronic payment network according to an embodiment of the present invention.

The database server 95 can be used to store customer and merchant account and promotional information in separate records, tables, or columns in an associated database, which may be received from the payment network 31. As is understood in the art, the database server 95 includes a processor directing data from a bus into the database memory, which can be e.g., a hard drive, optical storage or the like, and computer software that provides each of the plurality of issuer component computers (not shown), including the member interface protocol computer 81, access the data therein FIG. 15 shows an exemplary database structure for customer data stored in database server 95, though one skilled in the art will appreciate other database structures are possible and are included within the scope of the invention. Database 1500, for example, includes customer account table 1502, a product provider table 1504, and a product order table 1506. The account customer account table 1502 includes columns, i.e., fields for data entry, such as, e.g., a customer account number, a customer name, a customer address, a customer email address, a customer telephone number and a customer's order history. The product provider table 1504 includes columns for e.g., a product provider account number, a product order code, a product provider name; a product provider address, a customer utilization rate for products, a product provider email address, and a product provider telephone number. The product order table 1506 includes columns for, e.g., a product name, a product quantity, i.e., how many of an item are in stock, a stock status, i.e., when additional stock will become available or if the product is overstocked, and a ship date, i.e., estimated date for product shipping. As one skilled in the art will appreciated, each of these tables may include dependent tables for each of the columns, e.g., the address column for the customer account table or product provider table may be implemented as another table with separate columns for the street, state, and zip code for each customer account and each product provider. Moreover, database 1500 may include fewer or more data tables and columns depending upon the implementation of the particular embodiment of the invention. Those skilled in the art will understand and recognize that multiple order codes, and a customers' personal information can also be included in the database tables and columns, and that database server can be implemented as a single computer, server, plurality of computers or servers, or as separate component of the member interface protocol computer 81.

As shown in FIGS. 1 and 14, telecommunications interface 107 allows a customer 65, product provider 91, or a merchant (not shown) to connect to the issuer processor computer using a telephone line, or the like, and may be a standard telephone network device such as a PBX. As one skilled in the art will appreciate, web server 109 provides the payment network, merchants, product providers and customers, networked computer access to the issuer processor computer network, and is used to manage computer traffic into and away from the issuer processor computer 61. As such, web server 109 is configured with processors, memory, and I/O devices to allow efficient exchange of data between the member interface protocol computer 81, its related components, the payment network 31, product provider 91, and customer 65 to facilitate the web functions thereof.

Figure 13:
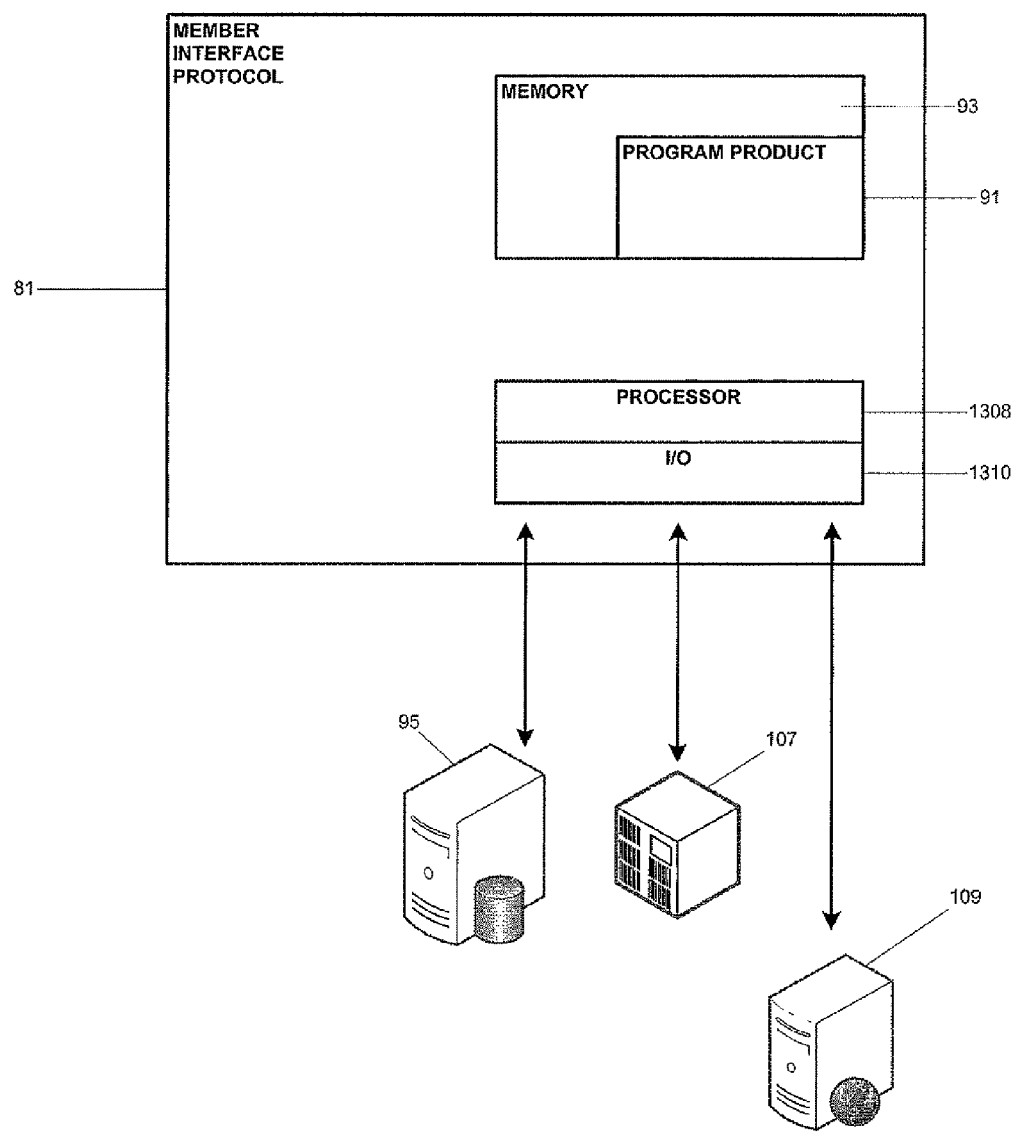
FIG. 13 is a schematic block diagram of a member interface protocol computer according to an embodiment of the invention.

Member interface protocol computer 81 can be configured as a computer, a server, or a system of distributed computers or server that at least include memory 93, program product 91, processor 508, input/output device and ("I/O") 1310, as shown in FIG. 13. Member protocol computer I/O device 1310 connects the member interface protocol computer 81 to issuer processor computer 61, database server 95, telecommunications interface 107, and web server 109, to thereby allow member interface protocol computer 81 to send and receive order data. I/O device 1310 can be any I/O device including, but not limited to a network card/controller connected by a PCI bus to the motherboard, or hardware built into the motherboard of the member interface protocol computer 81 to connect same to the network.

As can be seen, the I/O device is connected to the processor 1308. Processor 1308 is the "brains" of the member interface protocol computer 81, and as such executes program product 91 and works in conjunction with the I/O device 1310 to direct data to memory 93 and to send data from memory 93 to the database server 95, telecommunications interface 107, and web server 109. Processor 1308 can be any commercially available processor, or plurality of processors, adapted for use for the member interface protocol computer 81, e.g., Intel® Xeon® multicore processors, Intel® micro-architecture Nehalem, AMD Opteron™ multicore processors, etc. As one skilled in the art will appreciate, processor 1308 may also include components that allow the member interface protocol computer 81 to be connected to a display [not shown] and keyboard that would allow a user to directly access the processor 1308 and memory.

Memory 93 stores instructions for execution on the processor 1308, and consists of both non-volatile memory, e.g., hard disks, flash memory, optical disks, and the like, and volatile memory, e.g., SRAM, DRAM, SDRAM, etc., as required to process embodiments of the instant invention. As one skilled in the art will appreciate, though memory 93 is depicted on, e.g., the motherboard, of the member interface protocol computer 81, memory 93 may also be a separate component or device, e.g., FLASH memory, connected to the member interface protocol computer 81. Memory 93 may also store applications that various workstations can access and run on the member interface protocol computer 81. Importantly, memory 93 stores the program product 91 of the instant invention. As one skilled in the art will understand, the program product 91, along with one or more databases/tables/fields/records for customer electronic order card data and associated customer account data, products 53 and the order codes 55, can be stored either in memory 93 or in separate memory associated, for example, with a database server 95, positioned in communication with the member interface protocol computer 81, e.g., as shown in FIG. 15

Figure 12:
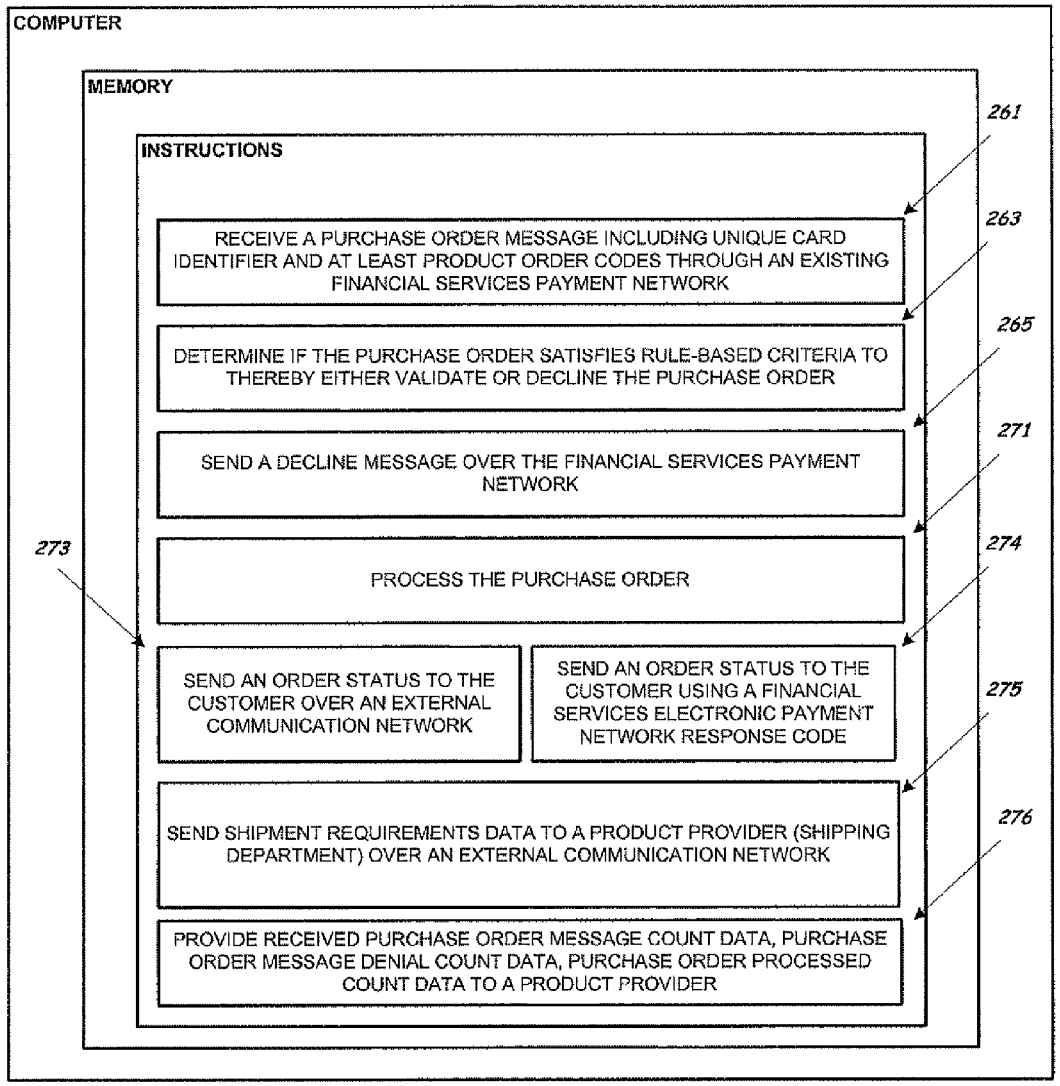
FIG. 12 provides a schematic diagram of an electronic order entry program product stored in a tangible computer readable medium and comprising a set of executable instructions that facilitate electronic ordering of goods, services, or goods and services collectively through messaging over an existing financial services electronic payment network.

The electronic order entry program product 91 can be configured to process the received purchase order message data and is described in more detail in reference to FIG. 12. The electronic order entry program product 91 can include a set of instructions that, when executed, for example, by the member interface protocol (computer or server, etc.) 81, cause the member interface protocol computer 81 to perform various operations to include receiving the purchase order message including the non-financial electronic order transaction information, e.g., through the payment network 31 and the issuer processor computer 61 (block 261), and determining if the purchase order satisfies rule-based criteria to thereby either validate or decline the purchase order (block 263). The operations can also include processing the order (block 265) to include sending an order status to the customer 65 using either the POS terminal, the telecommunications network or the computer network (blocks 273, 274). The operations also include sending shipment requirements, including the customers' address (which may be a physical address or a delivery address), to a shipping department of a product provider 97 over communication network 101 if the purchase order satisfies the rule-based criteria, such as a valid electronic order card number, valid order number, payment history, etc. (block 275). The operations can also include sending a decline message if the purchase order fails the rule-based criteria, e.g., wrong issuer processor, non-payment to a product provider or invalid electronic order card number (block 265). As decline messages are considered more critical and as they are readily compatible with transmission over the financial services electronic payment network 31, such messages may be preferably sent over the financial services electronic payment network 31, rather than through other means, though the customer may receive the decline message via email, telephone call, etc. If a merchant POS terminal 67 is being used, the decline message can be displayed on terminal display 68 (see, e.g., FIG. 5).

FIGS. 6-11 provide high-level flow diagrams illustrating method steps and operations for facilitating electronic ordering of goods, services, or combinations thereof (collectively "product" or "products"), through messaging over a financial services electronic payment network, such as, for example, the Visa®, MasterCard®, American Express®, or Discover® network, which is currently deployed to receive and process electronic payments through merchant POS terminals, such as, for example, merchant POS terminal 67, located at a merchant site. Note, a merchant as identified herein includes a merchant of both products (e.g., retail or wholesale stores or shops) and services (e.g., providers of professional and non-professional services). The various applications also include electronic ordering of products both where payment must be tendered and where no payment is required.

As an example of a conventional scenario where no payment is required, a sales clerk makes a sales appointment to visit a doctor's office to advertise samples of a new or featured pharmaceutical. After waiting 45 minutes or so to see the doctor, the sales clerk briefs the doctor on the new pharmaceutical and enters registration information about the doctor in a request form. The sales clerk then enters the information in a sales office computer. Upon approval of the doctor's registration, the sales clerk then returns to the doctor's office, waits another 45 minutes or so to see the doctor, and receives an order for one or more featured sample pharmaceuticals. After the order is processed at the sales office, the sales clerk then returns to the doctor's office to again see the doctor and deliver the requested samples. This typical scenario can take approximately 3 weeks. Beneficially, an embodiment of the present invention allows the sales clerk to replace at least one, and in some situations, all three of the trips to the doctor's office. Exemplary steps/operations for doing so are described in more detail, below.

Figure 6:
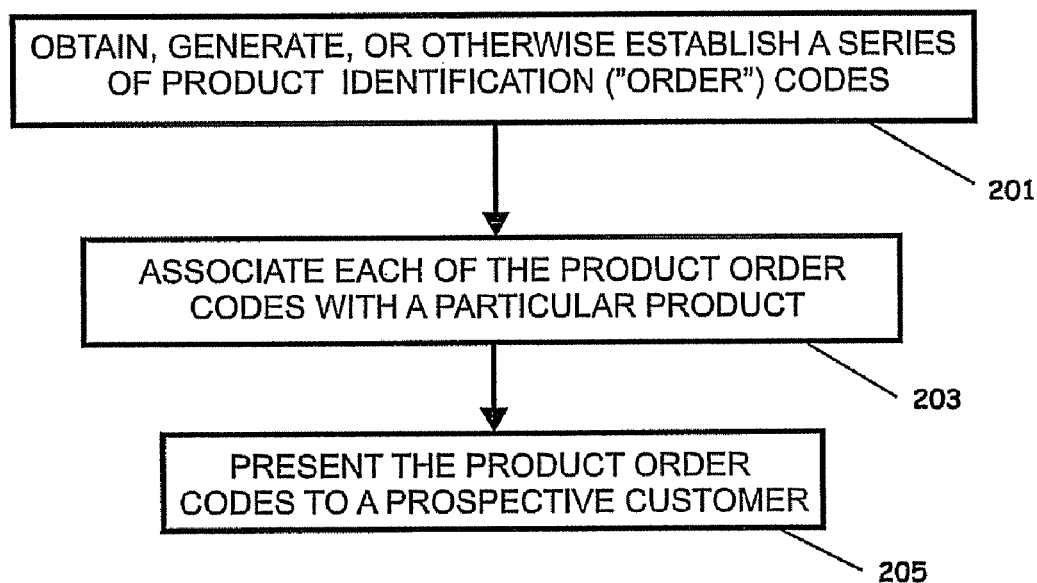
FIG. 6 is a schematic flow diagram illustrating steps for forming an product order code list or catalogue facilitating electronic ordering of goods, services, or goods and services, through messaging over a financial services electronic payment network according to an embodiment of the present invention.

FIG. 6 provides a flow diagram illustrating steps for forming a product order code list or catalogue 51 for facilitating electronic ordering of goods, services, or goods and services, through messaging over a financial services electronic payment network 31, according to an embodiment of the present invention. According to the exemplary embodiment, a product provider 97 offering the electronic order entry service or affiliated electronic order issuer obtains, generates, or otherwise establishes a series of, e.g., numeric, product identification or order codes 55 (block 201), which are each associated with a particular product 53 (block 203) which may identify or otherwise be differentiated by quantity, preferred delivery means, etc. Having established these codes 55, the business prepares and communicates those codes 55 to its customers 65 (block 205), e.g., by preparing an electronic or paper-based catalog 51 (see, e.g., FIG. 4) of its products 53 (goods and/or services) and their associated order codes 55, printing bar codes associated with the products 53, or through other means or medium known to those skilled in the art.

Figure 7:
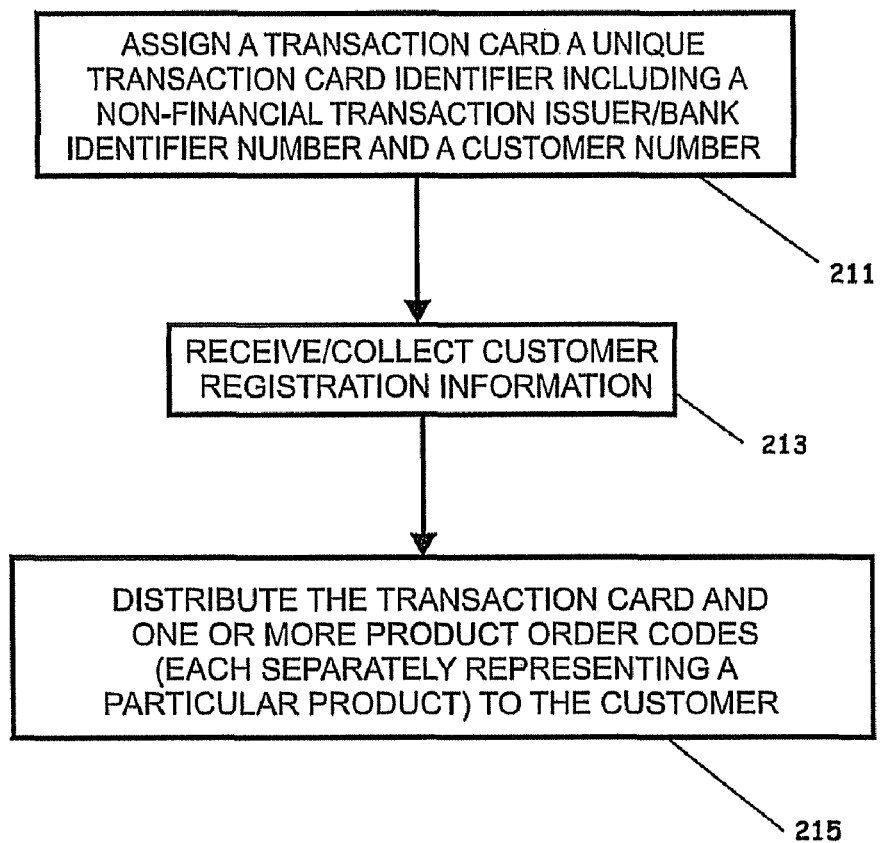
FIG. 7 is a schematic flow diagram illustrating steps for forming and distributing an electronic order electronic order card and product order codes for facilitating electronic ordering of goods, services, or goods and services, through messaging over a financial services electronic payment network according to an embodiment of the present invention.

FIG. 7 provides a flow diagram illustrating steps for fainting and distributing an electronic order electronic order card 33 and the order codes 55. For the order codes 55 to work, the business or card issuer provides an electronic order electronic order card 33 having a card number 35, 39, that is unique to its actual or prospective customer 65, whether the prospective customer is another businesses or end consumer. To this end, the business or card issuer assigns the electronic order card 33 (transaction card) a unique electronic order card number 35 (transaction card identifier) including an IIN 37 and a user/customer identification or processing number 39 (block 211). According to the exemplary configuration, the IIN 37 upon which the physical or virtual card functions is non-financial and non-settling, i.e., it is configured such that when electronic order entry (purchase order) messages instigated by the electronic order card 33 are transmitted, those messages are not financial transactions, and accordingly, no financial settlement occurs.

Typically after receiving or collecting customer registration information (block 213), the customer specific electronic order electronic order card 33 is delivered along with the catalog 51 (block 215). Card number (and catalog) delivery can either be electronic, e.g., via e-mail, or through actual delivery of, for example, a standard 30-mil plastic card with a magnetic stripe 41 or other storage medium, that functions on a traditional financial services payment network, e.g., MasterCard®, Visa®, American Express®, and Discover® network 31. Uniqueness of card numbers 35 can be preserved by generating all numbers through check-sum-digit algorithms based, for example, on DES-3 standards, or others known to those skilled in the art.

Figure 8:
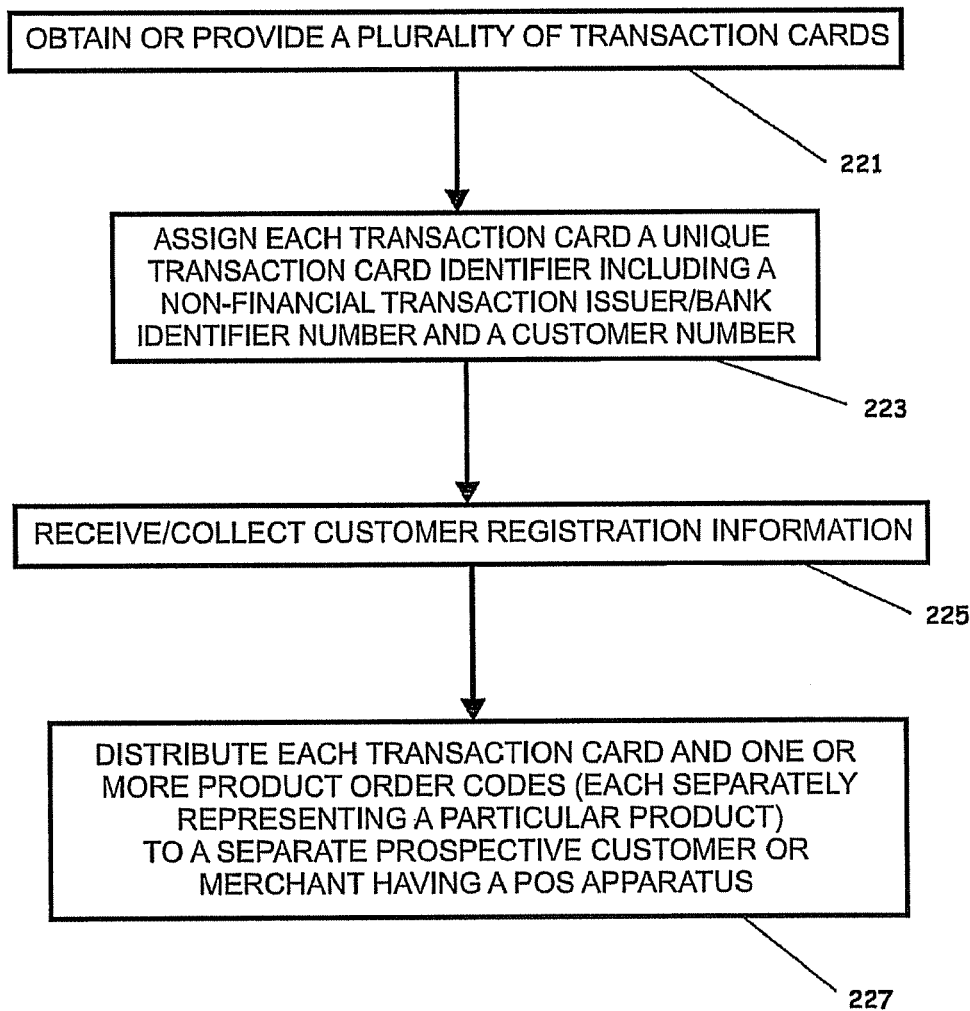
FIG. 8 is a schematic flow diagram illustrating steps for forming and distributing an electronic order electronic order card and product order codes for facilitating electronic ordering of goods, services, or goods and services, through messaging over a financial services electronic payment network according to an embodiment of the present invention.

FIG. 8 provides a flow diagram illustrating steps for forming and distributing an electronic order electronic order card 33 and the order codes 55 for a plurality of customers 65. The business or card issuer obtains or otherwise provides a plurality of electronic order electronic order cards 33 having a card number 35, 39, that is unique to each of its actual or prospective customers 65 (block 221), and assigns each electronic order card 33 a unique electronic order card identifier 35, 39, including a non-financial transaction IIN 37 and a customer number 39 (block 223). Upon separately receiving or collecting customer registration information (block 225), each electronic order card 33 is separately distributed to the separate prospective customer 65 along with a catalog or list 51 featuring one or more order codes 55 each separately representing a particular product 53 (block 227). Alternatively, some or all of the electronic order cards 33 can be first provided to a merchant having a POS terminal 67, for distribution to customers 65 whereby the merchant can collect customer information (if not already done so) for provision to the business (product provider) or card issuer, prior to individual distribution to customers 65. Other different delivery scenarios are, of course, within the scope of the present invention, to include presenting the electronic order cards 33 in the mail to customers 65 or potential customers 65 (collectively "customers") where the business or card issuer has at least a minimum amount of registration data.

Figure 9:
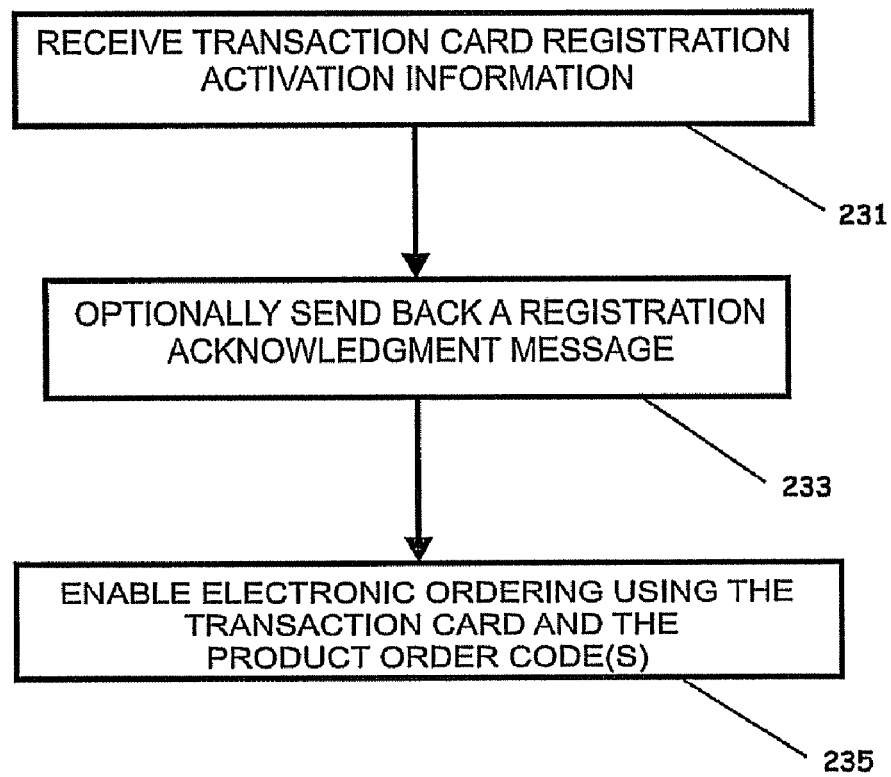
FIG. 9 is a schematic flow diagram illustrating steps for registering an electronic order electronic order card for facilitating electronic ordering of goods, services, or goods and services, through messaging over a financial services electronic payment network according to an embodiment of the present invention.

FIG. 9 provides a flow diagram illustrating steps/operations for registering an electronic order card 33 that has been delivered to a customer 65. Upon receipt of the catalog 51 and electronic card number 35, the customer 65 may register their interest in placing electronic orders through a web interface 109, or an interactive voice response unit, and short message service ("SMS" or "text") message, or other telecommunications interface 17, among others. Accordingly, the card issuer receives the electronic order card registration activation information from the customer 65 (block 231), optionally sends back a registration acknowledgment message (block 233), and enables electronic ordering by the customer 65 using the electronic order card number 35 of the electronic order card 33 and the order code(s) 55 listed in the catalog 51 (block 235).

After registration, the customer 65 places an order by entering the electronic order card number 35, entering the appropriate order code 55 and submitting the purchase order message. Customers 65 can use their respective physical or virtual cards 33 in one of several ways, e.g., swiping a physical card in a traditional point-of-sale terminal 67, e.g., Hypercom, Verifone, Lipman Nurit, Ingenico, etc., or by keying the traditional financial services payment network 16-digit card number (with or without the security code) into a traditional or web-based POS terminal 67, or over a device interface 75 such as a land-based or cellular telephone or wireless PDA, or using other electronic transmission technology, e.g., RFID, etc. The order is then transmitted through the payment network infrastructure to an issuer processor computer 61 and then to a member interface protocol computer 81.

Figure 10:
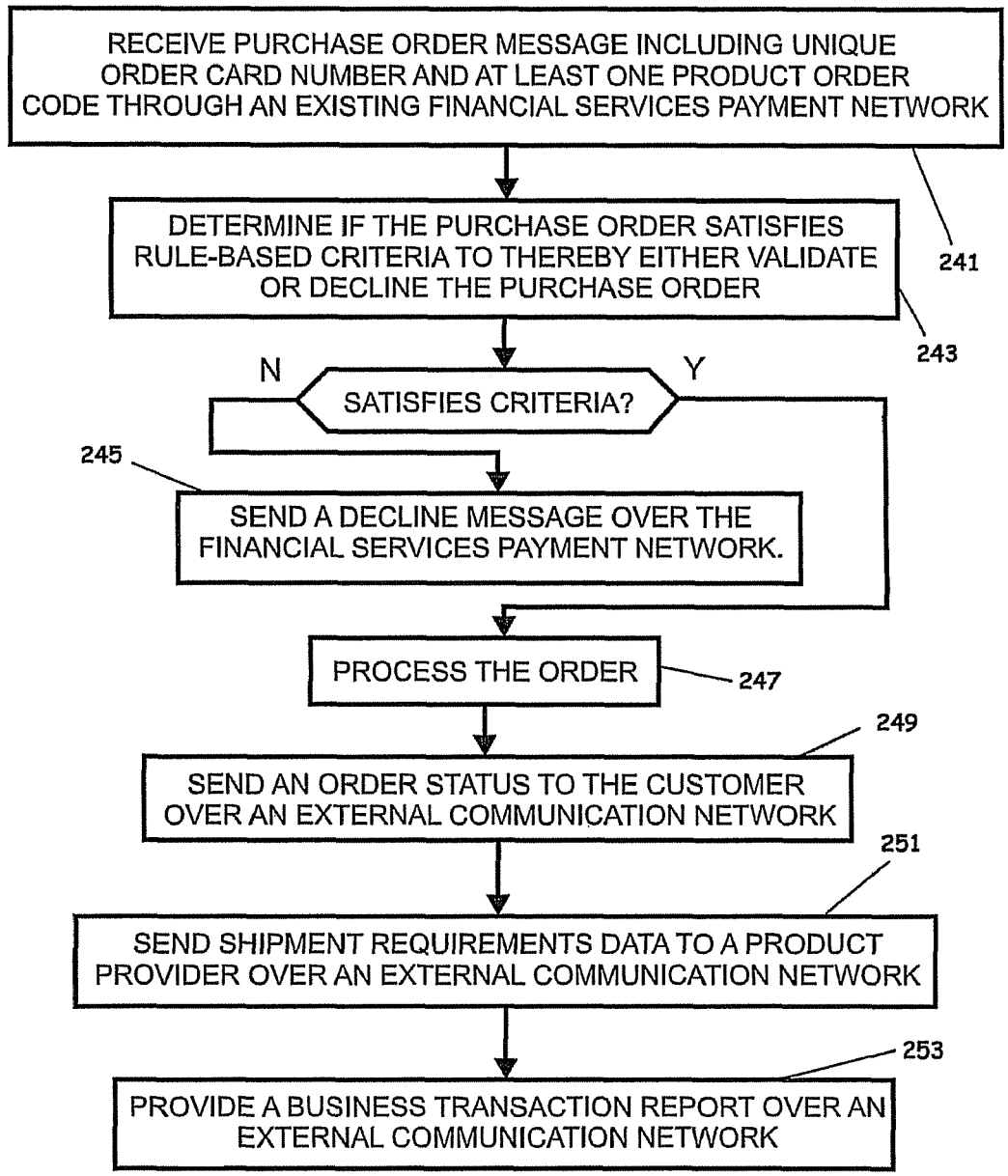
FIG. 10 is a schematic flow diagram illustrating steps associated with performing a no payment required electronic order entry using an electronic order card and product order codes and processing the electronic order according to an embodiment of the present invention.

FIG. 10 provides a flow diagram illustrating steps/operations associated with performing a "no payment required" electronic order entry, such as, for example, where a doctor having been provided the electronic order card 33 and associated order codes 55 (e.g., via mail delivery, etc.), and having "activated" the card, uses the doctor's office POS terminal 67 to order samples advertised to the doctor by the salesman on a prior visit. Having swiped the electronic order card 33 and indicated the desired sample pharmaceutical identified by the order code 55, the purchase order via a purchase order message is transmitted to an issuer processor computer over the payment network 31, and is correspondingly received by the issuer processor computer 61, member interface protocol computer 81, and/or other computer associated with the card issuer, for example (block 241). The purchase order message can include the electronic order card number 35, one or more order codes 55, and typically a merchant identification number, terminal identification number, and time-of-day.

It is then determined if the purchase order satisfies rule-based criteria to thereby validate or decline the purchase order (block 243). The order can be validated by satisfying any number of real-time, rules-based criteria, including, without limitation, electronic order card number, electronic order card security code, product category code, product provider identification number, merchant account number (if different from product provider) terminal identification number, time-of-day, allowable quantity, allowable number of purchases within a prescribed period of time, etc.

If the order is not validated, i.e., fails the rule-based criteria, the order it is not processed, and a "decline" message is sent over the financial services electronic payment network 31 (block 245), but may also be sent via email, telephone, text message or the like. If the order is validated, i.e., passes the rule-based criteria, the order is processed and fulfilled in accordance with terms set by the business 97 (e.g., pharmaceutical company) soliciting the order (block 247), and the order status is transmitted to the customer 65, e.g., by SMS message, by e-mail, or by sending a traditional payment network response code, which may be configured in such a way as to communicate additional order-specific data back to the customer 65 (block 249). Additionally, shipment requirements data is sent to the business 97 (e.g., shipping department) over an external communication network 101 (block 251). Further, the web-based portion, e.g., Web server 109, allows the business to access and review, among other things, the number of orders that have been transmitted, denied, and processed and fulfilled.

FIG. 11 provides a flow diagram illustrating steps associated with performing a "payment required" electronic order entry, such as, for example, where a retail customer having been provided the electronic order card 33 and the order codes 55 (e.g., via mail delivery, etc.), and having "activated" the card, uses a local merchants POS terminal 67 to order goods or services advertised in a good and/or service catalog 51. Having swiped the electronic order card 33 and indicated the desired product identified by the order code 55, the order via a purchase order message is transmitted an issuer processor computer 61 over the payment network 31, and is correspondingly received by the issuer processor computer 61, member interface protocol computer 81, and/or other computer associated with the card issuer, for example (block 261). Alternatively, a customer 65 may be provided instructions to access the payment network 31, issuer processor computer 61, member interface protocol 81, and merchant acquirer computer, via a device interface 75 such as an internet, telephone, a cellular telephone, PDA, or other similar device, etc., capable of communicating with a merchant acquirer computer 63.

As with the "no payment" scenario, upon receipt of the purchase order message, it is determined whether or not the purchase order satisfies rule-based criteria to thereby either validate or decline the purchase order (block 263). If the order is not validated, i.e., fails the rule-based criteria, the order it is not processed, and a "decline" message is sent over the financial services electronic payment network 31 (block 265). If the order is validated, i.e., passes the rule-based criteria, it is then determined/verified whether or not an indication that payment has been made has been received (block 267). Such indication can be provided by various methodologies including, but not limited to, simply delaying at least a portion of the order processing until after expiration of sufficient time for the merchant to "back out" of the order transaction, or the merchant positively providing a payment receipt indication through an external communication network 101, either directly to the card issuer or indirectly through the business 95. In such case, if no payment verification is provided, the order would generally be canceled (block 269) or a query submitted.

Upon direct or assumed verification of payment, the order is processed and fulfilled in accordance with terms set by the business 97 soliciting the order (block 271). Either before or after payment verification, the order status can be transmitted to the customer 65, e.g., by SMS message, by e-mail, or by sending a traditional payment network response code, which may be configured in such a way as to communicate additional order-specific data back to the customer 65 (blocks 273 and 274). Additionally, shipment requirements data is sent to the business 97 (e.g., shipping department) over an external communication network 101 (block 275), and the number of orders that have been transmitted, denied, processed, and fulfilled, are made available to the business 97 through the computer network 105 (block 277). Further, settlement for either individual transactions or a batch of transactions are periodically made between the business 97 and the card issuer, or alternatively, made according to other contractual methodologies (block 279).

It is important to note that while embodiments of the present invention have been described in the context of a fully functional system, those skilled in the art will appreciate that the mechanism of at least portions of the present invention and/or aspects thereof are capable of being distributed in the form of a computer readable medium of instructions in a variety of forms for execution on a processor, processors, or the like, and that embodiments of the present invention apply equally regardless of the particular type of signal bearing media used to actually carry out the distribution. Examples of computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and operations instructions related to the program product 91 and the method steps/operations, described above.

Accordingly, an embodiment of the present invention can include a computer readable medium that is readable by a computer, e.g., member interface protocol computer 81 or issuer processor computer 61, to manage electronic order card activation, electronic order entry, and payment processing. The computer readable medium can include a set of instructions (e.g., program product 91 and/or above described method steps/operations capable of being performed by a computer, in computer readable form that, when executed by the computer, cause the computer to perform various operations to include the operations of receiving a purchase order message containing a purchase order sent through an existing financial services electronic payment network 31, determining if the purchase order satisfies rule-based criteria to thereby either validate or decline the purchase order, sending a decline message over the financial services electronic payment network 31 if the purchase order fails the rule-based criteria, and processing the purchase order if the purchase order satisfies the rule-based criteria.

According to an embodiment of the present invention, the purchase order message includes a unique electronic payment network compatible electronic order card identifier 35 associated with a physical or virtual electronic order card 33, and one or more order codes 55, each associated with a different product 53. The electronic order card identifier 35 can be configured to enter a specific pre-selected electronic payment network 31, e.g., MasterCard®, Visa®, American Express®, or Discover® networks. The unique electronic order card identifier 35 can include a non-financial transaction IIN 37 and a customer identification number 39 associated with a specific customer 65. And, the rule-based criteria can include at least portions of the electronic order card identifier 35, the product order code or codes to 55, and one or more of the following: an allowable quantity, an allowable number of purchases within a prescribed period of time, and a electronic order card security code associated with the electronic order card 33, for example.

According to an embodiment of the present invention, the electronic order card 33 is a physical card configured to interface with a point-of-sale terminal 67 to enable electronic ordering over the existing financial services electronic payment network 31 using the electronic order card 33 and the product order code or codes 55. Correspondingly, the purchase order message can further include data such as a merchant category code, merchant identification number, merchant identification number, terminal identification number, and time-of-day, and if the terminal supports partial messaging, a flag indicating such support. Similarly, the rule-based criteria can further include a terminal identification number, merchant category code, merchant identification number, and the time-of-day.

Figure 11A:
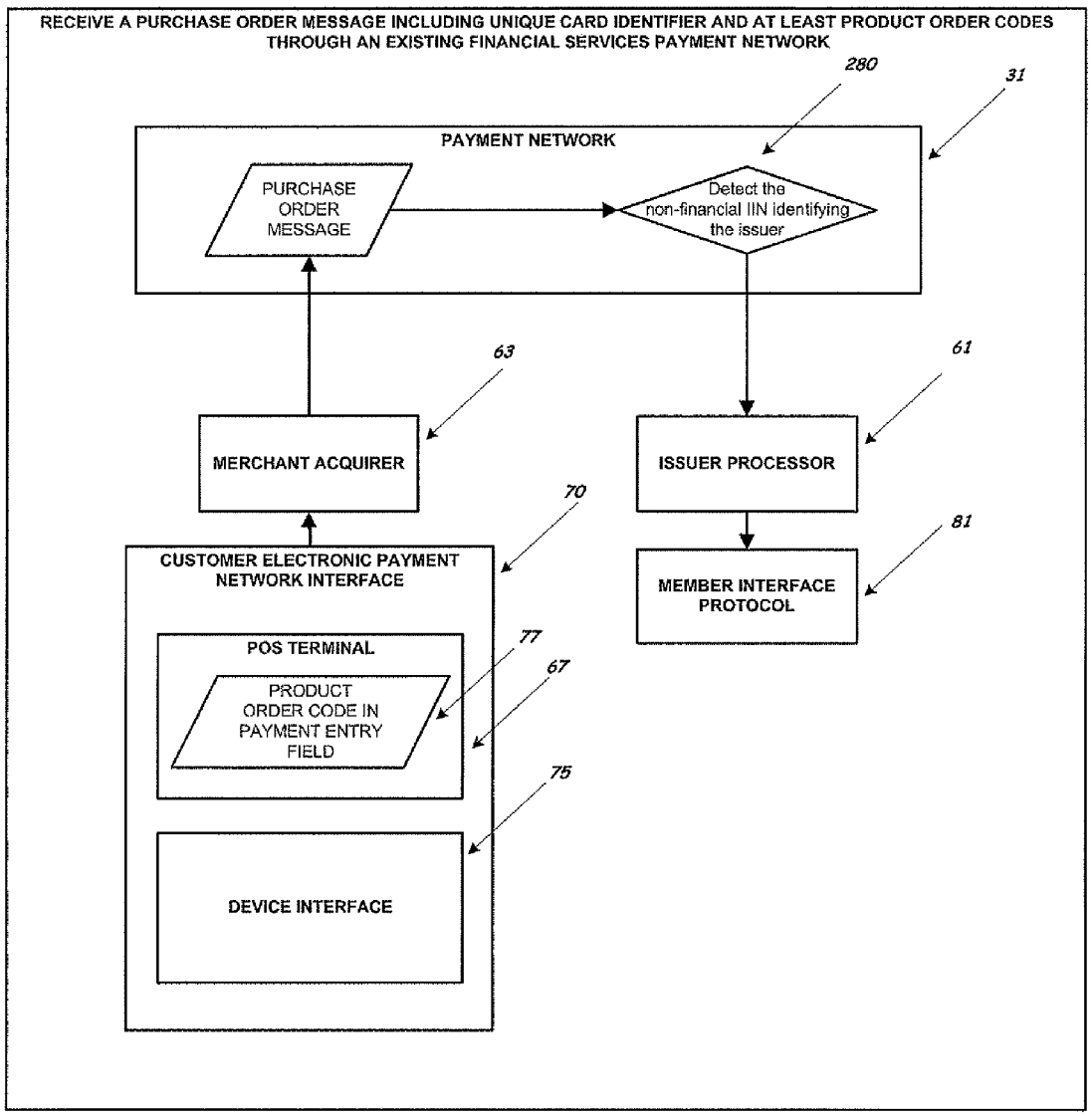
FIG. 11A is a schematic flow diagram illustrating steps associated with the operation of receiving a purchase order message in FIG. 11.

According to the preferred configuration, the product order code or codes 55 can be received through the point-of-sale terminal payment entry field 77 (FIG. 11A). Accordingly, after swiping the electronic order card 33, a customer can enter the order code 55 directly into the payment entry field in place of a payment amount.

FIGS. 11 and 11A provide a flow diagram illustrating the operation of receiving at an issuer processor computer 61 a purchase order message. The operation of receiving a purchase order message can include receiving the purchase order message from an issuer processor computer 61 associated with a card issuer and configured to receive the purchase order message from the financial services electronic payment network 31 in response to components of the financial services electronic payment network 31 detecting/determining 280 the non-financial IIN 37 to be identifying the specific card issuer or the issuer processor computer 61. The components of the financial services electronic payment network 31 correspondingly receive the purchase order message from a merchant acquirer computer 63 in communication therewith, which can receive the purchase order message from the electronic payment network interface 70 which is a POS terminal 67 and/or from a device interface 75 such as a telephone, a cellular telephone, PDA, or a personal computer, in communication with the merchant acquirer computer 63. The member interface protocol computer 81 receives at least portions of the purchase order message from the issuer processor computer 61.

In FIGS. 11 and 12, the operation of processing the purchase order can include the operations of sending an order status over an external communication network 101 (e.g., telecommunication or computer network 103, 105) to a customer 65 initiating the purchase order, or alternatively, sending an order status back through the financial services electronic payment network 31 to the customer 65 initiating the purchase order through use of a financial services electronic payment network response code. The operation of processing the purchase order can also further include sending shipment requirements data over an external communication network 101 (e.g., computer network 105) to the product provider 97 that is soliciting the purchase order. The operations can also further include providing (block 276) to the provider 97 "received" purchase order message count data, purchase order message denial count data, and purchase order processed count data associated with the respective product provider 97.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

The invention claimed is:

1. A system for facilitating the management and electronic ordering of goods and services over an existing electronic financial network, the system comprising:
a product identification medium including identification indicia for each of a plurality of products of a products provider presented in association with identification indicia for each of a plurality of product order codes to thereby allow a plurality of customers to identify a desired product;
a customer order transaction card for ordering one or more of the plurality of products of the products provider, the transaction card having a storage medium for storing an electronic payment network compatible transaction card identifier unique to a specific customer of the plurality of customers, the identifier comprising an issuer identifier number and a specific customer account number of a plurality of customer account numbers associated with the product provider;
a point of sale terminal configured to interface with a plurality of cards, including the transaction card and to receive one or more of the plurality of product order codes and the identifier of the customer order transaction card and transmit the one or more of the plurality of product order codes and the identifier via an existing financial services electronic payment network to an issuer of the customer order transaction card responsive to the existing financial services electronic payment network identifying the issuer of the customer order transaction card; and
a computer to facilitate electronic ordering and management of products over the existing financial services electronic payment network defining a member interface protocol computer, the member interface protocol computer comprising:
non-transitory memory encoded with computer program operable on the member interface protocol computer, the computer program comprising the instructions of:
receiving by the member interface protocol computer from the issuer of the customer order transaction card a product order message sent through the existing financial services electronic payment network, the product order message including one or more of the plurality of product order codes and the identifier of the customer order transaction card and being responsive to the point of sale terminal receiving the one or more of the plurality of product orders and interfacing with the customer order transaction card to thereby receive the identifier of the customer order transaction card;
determining, by the member interface protocol computer, whether the purchase order message satisfies rule-based criteria;
creating, by the member interface protocol computer, an error notification to send via the existing financial services electronic payment network when the purchase order message does not satisfy the rule-based criteria;
matching, by the member interface protocol computer, each of the one or more of the plurality of product order codes in the purchase order message with one or more of the plurality of corresponding products of the product provider when the purchase order message satisfies the rule-based criteria to thereby create a valid product order; and
creating, by the member interface protocol computer, an order notification for the product provider indicating the one or more of the plurality of corresponding products ordered using the existing financial services electronic financial payment network and the associated one or more of the plurality of customers.

2. A system as defined in claim 1, wherein the order notification includes shipping requirements for the product order, and the computer program further comprising the instruction of:
communicating an order status to the one or more of the plurality of customers via a communication network different from the existing financial services electronic payment network.

3. A system as defined in claim 1, the computer program further comprising the instruction of:
communicating an electronic payment network response code via the existing financial services electronic payment network to thereby communicate an order status to the one or more of the plurality of customers.

4. A system as defined in claim 1, wherein the one or more of the plurality of product order codes are entered as a payment amount when payment is not required.

5. A system as defined in claim 1, wherein the point of sale terminal includes a scanner or keyboard to enter the one or more of the plurality of product order codes, and wherein the transaction card is associated with a customer profile.

6. A system as defined in claim 1, wherein the customer account number is associated with a monetary account so that the system can facilitate financial settlement of the valid product order in addition to the ordering of the one or more products.

7. A system as defined in claim 1, wherein one or more of the plurality of customer accounts are non-financial and financial settlement for the valid product order is not required.

8. A system as defined in claim 1, wherein the rule-based criteria includes one or more of the following: acknowledgement of sufficient payment for the one or more of the plurality of products, valid transaction card identifier, allowable quantity of the one or more of the plurality of products, and valid electronic card security code associated with the customer transaction card.

9. A computer-implemented method for facilitating the management and electronic ordering of goods and services over an electronic financial network, the method comprising the steps of:
associating, in a first computer process, each of a plurality of products of a products provider with a plurality of product order codes;
associating, in a second computer process, each of a plurality of customers with a customer account number;
associating, in a third computer process, each of the plurality of customers with a customer order transaction card, each of the transaction cards having an electronic payment network compatible transaction card identifier unique to a specific customer of the plurality of customers, the identifier comprising an issuer identifier number;
configuring an electronic payment network interface to receive one or more of the plurality of product order codes and one or more of the plurality of transaction card identifiers, the electronic payment network interface further being configured to transmit one or more of received plurality of product order codes and the one or more of the plurality of transaction card identifiers via an existing financial services electronic payment network to one or more of the plurality of issuer of the plurality of customer order transaction cards responsive to the existing financial services electronic payment network identifying the one or more of the plurality of issuers of the plurality of customer order transaction cards;
determining, in a fourth computer process, whether a purchase order message satisfies rule-based criteria responsive to receiving from the one of the plurality of issuers of the customer order transaction cards a product order message sent through the existing financial services electronic payment network from the electronic payment network interface, the product order message being responsive to the electronic payment network interface receiving one or more of the transaction card identifiers and one or more of the plurality of product order codes to identify one or more products desired by one or more of the plurality of customers; and
matching, in a fifth computer process, each of the one or more of the plurality of product order codes in the purchase order message with one or more of the plurality of corresponding products of the product provider when the purchase order message satisfies the rule-based criteria to thereby create a valid product order.

10. A computer-implemented method as defined in claim 9, wherein the electronic payment network interface comprises at least one of the following: a telephone, a wireless personal digital assistant, or a point of sale terminal.

11. A computer-implemented method as defined in claim 9, wherein the existing financial services electronic payment network is controlled by one or more credit card companies.

12. A computer-implemented method as defined in claim 9, wherein the method further includes:
creating, in a sixth computer process, an order notification for the product provider indicating the one or more of the plurality of products ordered using the existing financial services electronic financial payment network, the one or more of the plurality of customers associated with the product order, and shipping requirements for the product order.

13. A computer-implemented method as defined in claim 9, wherein the method further includes:
communicating an order status to the one or more of the plurality of customers via a communication network different from the existing financial services electronic payment network.

14. A computer-implemented method as defined in claim 9, wherein the method further includes:
communicating an electronic payment network response code via the existing financial services electronic payment network to thereby communicate an order status to the one or more of the plurality of customers.

15. A computer-implemented method as defined in claim 9, wherein the one or more of the plurality of product order codes are entered as a payment amount when payment is not required.

16. A computer-implemented method as defined in claim 9, wherein one or more of the plurality of customer account numbers are each associated with a monetary account to thereby enable financial settlement of the valid product order in addition to the ordering of the one or more products.

17. A computer-implemented method as defined in claim 9, wherein the plurality of customer accounts are non-financial and financial settlement for the valid product order is not required.

18. A computer-implemented method as defined in claim 9, wherein the rule-based criteria includes one or more of the following: acknowledgement of sufficient payment for the one or more of the plurality of products, valid transaction card identifier, allowable quantity of the one or more of the plurality of products, and valid electronic card security code associated with the customer transaction card.

19. A system for facilitating the management and ordering of goods and services over an existing electronic financial network, the system comprising:

a customer order transaction card for ordering one or more of a plurality of products of a products provider, the transaction card having a storage medium for storing an electronic payment network compatible transaction card identifier unique to a specific customer of the plurality of customers, the identifier comprising an issuer identifier number and a specific customer account number of a plurality of customer account numbers associated with the product provider;

an electronic payment network interface configured to receive one or more of a plurality of product order codes and one or more of the plurality of identifiers of the customer order transaction card and transmit the one or more of the plurality of product order codes and the plurality of identifiers via an existing financial services electronic payment network to an issuer of the customer order transaction card responsive to the existing financial services electronic payment network identifying the issuer of the customer order transaction card; and a computer to facilitate electronic ordering of products over the existing financial services electronic payment network defining a member interface protocol computer, the member interface protocol computer comprising:

non-transitory memory encoded with computer program operable on the member interface protocol computer, the computer program comprising the instructions of:

receiving by the member interface protocol computer from the issuer of the customer order transaction card a product order message sent through the existing financial services electronic payment network, the product order message including one or more of the plurality of product order codes and one or more of the identifiers of customer order transaction cards;

determining, by the member interface protocol computer, whether the purchase order message satisfies rule-based criteria;

creating, by the member interface protocol computer, an error notification to send via the existing financial services electronic payment network when the purchase order message does not satisfy the rule-based criteria; and matching, by the member interface protocol computer, each of the one or more of the plurality of product order codes in the purchase order message with one or more of the plurality of corresponding products of the product provider when the purchase order message satisfies the rule-based criteria to thereby create a valid product order.

20. A system as defined in claim 19, wherein the rule-based criteria includes one or more of the following: acknowledgement of sufficient payment for the one or more of the plurality of products, valid transaction card identifier, allowable quantity of the one or more of the plurality of products, and valid electronic card security code associated with the customer transaction card.

\* \* \* \* \*

UNITED STATES PATENT AND TRADEMARK OFFICE
CERTIFICATE OF CORRECTION

PATENT NO. : 8,108,977 B1
APPLICATION NO. : 12/609896
DATED : February 7, 2012
INVENTOR(S) : Miller Page 1 of 1

It is certified that error appears in the above-identified patent and that said Letters Patent is hereby corrected as shown below:

Specification, Column 10, Line 2, please replace "machine 30" with "machine 30.";

Specification, Column 10, Line 15, please replace "therein" with "therein.";

Specification, Column 11, Line 49, please replace "FIG. 15" with "FIG. 15.".

Signed and Sealed this
Twenty-ninth Day of May, 2012

David J. Kappos
*Director of the United States Patent and Trademark Office*